United States Patent [19]
Hoagland

[11] Patent Number: 6,108,032
[45] Date of Patent: Aug. 22, 2000

[54] SYSTEM AND METHOD FOR IMAGE MOTION COMPENSATION OF A CCD IMAGE SENSOR

[75] Inventor: Kenneth A. Hoagland, Smithown, N.Y.

[73] Assignee: Lockheed Martin Fairchild Systems, Syosset, N.Y.

[21] Appl. No.: 08/956,538

[22] Filed: Oct. 23, 1997

Related U.S. Application Data

[60] Provisional application No. 60/030,089, Nov. 5, 1996.

[51] Int. Cl.$^7$ ........................................... H04N 7/18
[52] U.S. Cl. .......................... 348/144; 348/152; 348/169; 348/208; 382/107; 250/330
[58] Field of Search ..................... 348/143, 144, 348/150, 151, 161, 162, 169, 170, 171, 208, 295, 312, 317; 382/107; 358/213.11, 103; 250/206.1, 330–334

[56] References Cited

U.S. PATENT DOCUMENTS

| | | | |
|---|---|---|---|
| 4,010,319 | 3/1977 | Levine | 358/213 |
| 4,157,218 | 6/1979 | Gordon et al. | 354/66 |
| 4,242,700 | 12/1980 | Weimer | 358/44 |
| 4,264,930 | 4/1981 | White | 358/213 |
| 4,382,267 | 5/1983 | Angle | 358/213 |
| 4,505,550 | 3/1985 | Steinbruegge | 350/372 |
| 4,505,559 | 3/1985 | Prinz | 354/66 |
| 4,792,820 | 12/1988 | Norita et al. | 354/402 |
| 4,797,746 | 1/1989 | Ashcraft | 358/140 |
| 4,855,822 | 8/1989 | Narendra et al. | 358/103 |
| 4,908,705 | 3/1990 | Wight | 358/109 |
| 4,926,115 | 5/1990 | Tarleton et al. | 328/133 |
| 5,155,597 | 10/1992 | Lareau et al. | 358/213.24 |
| 5,231,502 | 7/1993 | Pfister | 358/213.11 |

(List continued on next page.)

FOREIGN PATENT DOCUMENTS

| | | | |
|---|---|---|---|
| WO 92/10059 | 6/1992 | WIPO | H04N 3/15 |
| WO 96/41480 | 12/1996 | WIPO | H04N 7/18 |
| WO 98/20301 | 5/1998 | WIPO | G01C 11/02 |

OTHER PUBLICATIONS

Valdes, Sergio F., "Image motion compensation for step–stare systems by focal plane and optics manipulation", *SPIE vol. 197*: Modern Utilization of Infrared Technology V, (1979), pp. 41–47.

Jenkins, Steven J. and J.M. Hilkert, "Line of sight stabilization using image motion compensation", *SPIE vol. 1111*: Acquisition, Tracking, and Pointing III, (1989), pp. 98–115.

Kawachi, Donald A., "Image Motion and Its Compensation for the Oblique Frame Camera", *Photogrammetric Engineer*, (Jan. 1965), pp. 154–165.

Kostishack, D.F. et al., "Continuous–scan charge–coupled device (CCD) sensor system with moving target indicator (MTI) for satellite surveillance", *SPIE vol. 252*: Smart Sensors II, (1980), pp. 44–53.

*Primary Examiner*—Chris S. Kelley
*Assistant Examiner*—Tung Vo
*Attorney, Agent, or Firm*—Sterne, Kessler, Goldstein & Fox, P.L.L.C.

[57] ABSTRACT

An electronic system and method for minimizing the loss of image sharpness caused by image motion during the exposure interval of a camera using electro-optical area array image sensors is provided. Differential speed clocking is performed using a set of parallel shift registers to achieve improved image motion compensation ("IMC") performance. A large number of rows and columns contained in a CCD array are arranged in a variable number of row segments. In situations where IMC is needed, a variable frequency clocking method can be applied to these row segments in the CCD array. This method of parallel shift clocking provides for IMC in a reconnaissance system in low light conditions where narrow shutter widths are not practical. An aerial reconnaissance system user utilizing this IMC method can perform forward oblique reconnaissance missions in a straightforward manner. Complexity in CCD design and processing is reduced with this approach, which is utilized in either a small or large array format CCD.

36 Claims, 10 Drawing Sheets

U.S. PATENT DOCUMENTS

| | | | |
|---|---|---|---|
| 5,272,535 | 12/1993 | Elabd | 358/133 |
| 5,295,010 | 3/1994 | Barnes et al. | 359/107 |
| 5,379,065 | 1/1995 | Cutts | 348/269 |
| 5,528,592 | 6/1996 | Schnibler et al. | 370/60 |
| 5,528,595 | 6/1996 | Walsh et al. | 379/93 |
| 5,604,534 | 2/1997 | Hedges et al. | 348/144 |
| 5,607,122 | 3/1997 | Hicks et al. | 244/17.19 |
| 5,668,593 | 9/1997 | Lareau et al. | 348/146 |
| 5,692,062 | 11/1997 | Lareau et al. | 382/107 |
| 5,745,808 | 4/1998 | Tintera | 348/229 |
| 5,798,519 | 8/1998 | Vock et al. | 250/206.1 |
| 5,798,786 | 8/1998 | Lareau et al. | 348/144 |
| 5,844,602 | 12/1998 | Lareau et al. | 348/144 |

SYSTEM AND METHOD FOR IMAGE MOTION COMPENSATION OF A CCD IMAGE SENSOR

CROSS-REFERENCE TO RELATED APPLICATIONS

This patent application is related to the following provisional application, the disclosure of which is incorporated herein by reference:

"Improved Electro-Optical Reconnaissance System," Ser. No. 60/030,089, by Bryan H. Coon and Bruce Mathews, filed on Nov. 5, 1996.

BACKGROUND OF THE INVENTION

1. Field of the Invention

This invention relates generally to a system and method for the compensation of image motion during aircraft reconnaissance missions. In particular, this invention utilizes electronic methods for minimizing the loss of image sharpness caused by image motion during the exposure intervals of cameras using electro-optical area array image sensors.

2. Related Art

Aerial reconnaissance systems have undergone a dramatic transition in the past two decades with the replacement of photographic film by electro-optic image sensors. With the advent of wafer-scale focal planes that provide sufficient coverage and resolution, reconnaissance systems are being designed to utilize electro-optic sensors configured as large format area arrays. These electro-optic ("EO") reconnaissance imaging systems most often employ charge-coupled devices ("CCDs") operating in the visible and near-infrared regions of the electromagnetic spectrum to capture the image of the target or scene. The ability to operate in a real-time environment and in low ambient light conditions are just a few of the reasons why electro-optical-based reconnaissance imaging systems are increasingly replacing film-based reconnaissance systems.

One of the more frequently encountered problems in designing aerial reconnaissance imaging systems is determining the most effective method of compensating for image smear or blurring. Typically, smearing occurs when low ambient light conditions prevent an imaging system from using sufficiently short exposure times, resulting in a blurred image due to the forward motion of the aircraft. In other words, smearing occurs as a result of the relative motion between a scene or target to be imaged and the imaging system. Therefore, in order to prevent the degradation of the information contained in a recorded image, an ideal reconnaissance imaging system must utilize some means of image motion compensation ("IMC") for image smear.

For example, if the target being imaged is directly below the aircraft, the relative motion of the image will be directly proportional to the forward velocity of the aircraft and inversely proportional to the aircraft's altitude and thus easily compensated. However, any practical IMC method must also factor in the problems associated with operating the reconnaissance imaging system at a non-perpendicular and oblique angle from the direction of motion of the aircraft. In these oblique angle instances, typically referred to as side oblique or forward oblique orientations, the images of objects in the field of view of the imaging system that are a closer distance to the aircraft (i.e., near field objects) move relatively faster than the images of objects at a farther distance from the aircraft (i.e., far field objects).

The manner in which the scene image appears to move, and the extent of how much it moves, depends upon the flight parameters (e.g., altitude, velocity, etc.), the imaging system parameters (e.g., exposure time, lens focal length, etc.), and upon the orientation of the target area with respect to the imaging system (e.g., vertical, side oblique or forward oblique). The presence of these image motions at the focal plane introduces smear in the image. Depending on flight and system parameters, if the motions remain uncompensated a greater or lesser degradation in image quality and resolution results. In order to reduce such smearing of the image, various techniques for forward motion compensation (FMC) or IMC have been developed.

Some conventional methods of image compensation employed in reconnaissance imaging systems are mechanically based. For example, one early mechanical technique involved translating film in the same direction and velocity as the image motion, so that the image appears stationary on the moving film. Additionally, this same technique can be employed by moving a CCD (as opposed to film) proportional to the velocity and direction of the image motion. U.S. Pat. No. 4,908,705, issued Mar. 13, 1990 to Wight et al., which is incorporated herein by reference, discloses such a technique where the array physically moves fore and aft in the same direction as the apparent motion of the image to reduce the smear. Another related mechanical technique involves translating the focussing lens relative to the motion of the image. Again, the image at the focal plane appears to be stationary using this technique. However, this technology does not account for differences in relative image motion between near-field and far-field objects.

With the increased use of CCD arrays instead of film in many reconnaissance imaging systems, IMC methods are now based either solely on electronic means or on a combination of mechanical and electronic methods. One such electronic method is column-segmented forward motion compensation.

Column-segmented FMC is typically designed to work with either a between-the-lens shutter or a focal plane shutter camera. Here the area of the imager is broken up into some number of segments, with each segment being a group of columns. The size of the segments is dictated by the magnitude of the differential motion in the column direction for segments across the array and the practicality of adding ever more segments.

An example of column-segmented FMC is disclosed in U.S. Pat. No. 5,155,597 issued Oct. 13, 1992 to Lareau et al., which is also incorporated herein in its entirety by reference. Briefly, Lareau discloses an apparatus and method for the correction for the image motion in side oblique operation by transferring the charge in the CCD array along column groups at different transfer rates, corresponding to the depression angle of the column segment of the imager with respect to the horizon reference of the vertical field-of-view.

As described in the above Lareau reference, column-segmented FMC is useful for side oblique operation when the column direction is oriented in the same direction as the aircraft line of flight. In this case image motion is greatest along column segments for receiving images from scene objects near the aircraft.

With forward oblique camera orientation, the column direction is typically co-planar with the flight direction, resulting in large variations of image motion from top to bottom of each column segment. In this case, IMC clock frequencies for all column segments are typically set at an average value, which cannot correct for the range of motion along the columns. Thus, the column segmentation method described above offers little or no advantage for forward oblique applications.

A major factor to consider in implementing an EO reconnaissance system is minimizing complexity in device design and processing, which is essential to obtaining sufficient yield to make the device economically viable. The column segmented FMC method described above exemplifies a device requiring complex design features and device processing (e.g., accessing clock electrodes in each column segment). What is needed is a device design with minimum design and processing complexity that allows IMC in one or more of the commonly used camera orientations. In addition, it is also desirable for a device design which, if required to be more complex, can provide IMC for side oblique, forward oblique, or any camera orientation requiring combined side and forward oblique compensation.

SUMMARY OF THE INVENTION

The present invention relates generally to a system and method for the compensation of image motion during reconnaissance missions. In particular, this invention utilizes electronic methods for minimizing the loss of image sharpness caused by image motion during the exposure intervals of cameras using electro-optical area array image sensors. In several different reconnaissance scenarios, the present invention makes use of differential speed clocking of a set of parallel shift registers to achieve improved image motion compensation ("IMC") performance in low light conditions independent of a focal plane array shutter.

According to one embodiment of the present invention, a focal plane array, for use in an optical reconnaissance system, is configured to detect an image of a scene and to convert the image into an electronic charge representation of the image. The focal plane array includes a main format area, which comprises a plurality of photo-sensitive cells arranged in rows and columns. The pixel rows are further arranged into a number of row segments, where each row segment corresponds to a separate clocking section. Each row segment is clocked in parallel, but at different clocking frequencies to compensate for the image motion of objects contained in the scene. The electronic charges are read out through a series of serial registers, located nearest the last row segment of the focal plane array. In a preferred embodiment of the present invention, the focal plane array is a charge-coupled device (CCD).

According to another embodiment of the present invention, IMC clocking is performed as follows. First, a focal plane array control unit drives the main format area of the focal plane array with a set of parallel shift clocking signals to perform IMC. The focal plane array control unit includes a master timing signal generator that receives data signals from the camera control unit and generates timing signals used to synchronously drive the focal plane array. A focal plane array driver circuit receives the timing signals from the master timing signal generator and then drives the row segments of the focal plane array with a predetermined number of three-phase clocking signals. Each synchronous, separate parallel shift clocking signal has a predetermined integer number of cycles. The number of cycles increases corresponding to the rate of motion of objects contained in the portion of the scene focussed on that particular row segment.

According to a further embodiment of the present invention, a method of image motion compensation is described as follows. First, a scene is imaged onto the focal plane array with focussing means, where the focal plane array includes a plurality of electro-optic cells arranged in rows and columns. The rows are further arranged into a predetermined number of row segments, where each row segment corresponds to a separate clocking section. Next, a predetermined number of synchronous, separate clocking signals are generated to perform parallel shift clocking on the row segments. Charges representing the portion of the scene stored in each row of a particular row segment are transferred at a charge transfer rate corresponding to an average motion rate that the objects from the portion of the scene appear to move across that particular row segment The electronic charges are eventually stored as a digital signal by a digital recording device.

According to another embodiment of the present invention, the main format area of the focal plane array is divided into an image area and a storage area. Preferably, the image area and the storage area are of approximately equal size. The storage area, which is shielded from exposure to the scene, stores the electronic charge representation of the image during a read out time of the system. Preferably, the electronic charge representation of the scene is shifted from the image area to the storage area in a time much less than the readout time from the storage area.

According to another embodiment of the present invention, the main format area is arranged in a predetermined number of row and column segments, called mosaic regions. Here, each mosaic region corresponds to a separate parallel clocking section. Each of the column groups in this embodiment is electronically isolated from neighboring column groups.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1A:
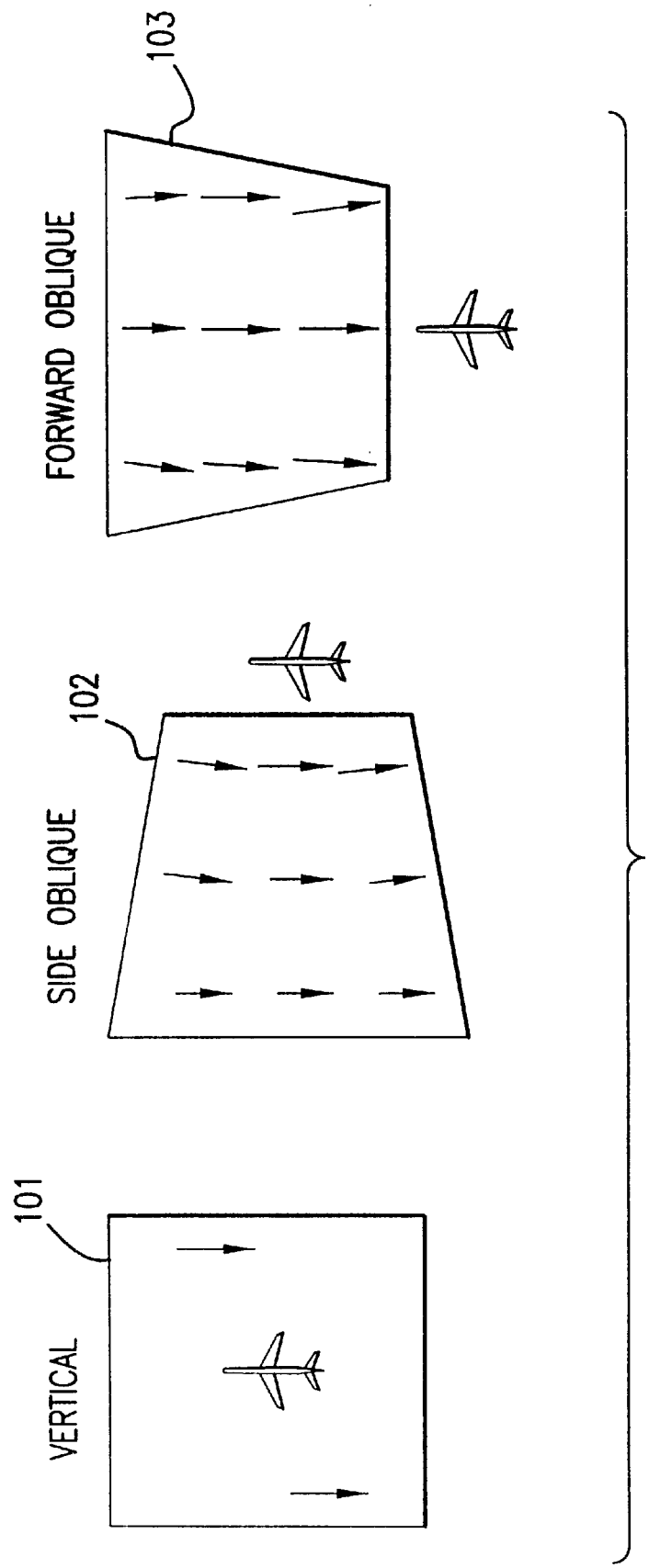
FIG. 1A illustrates the typical image motions under several different reconnaissance mission scenarios, and FIG. 1B provides a two dimensional illustration of an example environment for the aerial electro-optical reconnaissance system operating in a forward oblique viewing mode.

1. Overview and Discussion of the Invention

The present invention is directed toward an electronic system and method for minimizing the loss of image sharpness caused by image motion during the exposure interval of a camera using electro-optical area array image sensors. In particular, the invention utilizes differential speed clocking of a set of parallel shift registers to achieve improved image motion compensation ("IMC") performance. This method of parallel shift clocking provides for IMC in a reconnaissance system in low light conditions where narrow shutter widths are not practical.

A major factor to consider in designing a reconnaissance system is eliminating complexity in the device design and processing, which is essential to obtaining sufficient yield to make the device economically viable. At the same time though, the structure should be designed to allow for IMC. The preferred array architecture for the rows in the main format area is the simple three-phase structure, which is known to be easy to process with high yields. However, other array architectures based on other conventional clocking schemes (e.g., two-phase and four-phase structures) will be apparent to those skilled in the art based on the description below. Row segmentation is implemented by the simple expedient of providing independent interconnect lines for each segment. As larger size semiconductor wafers become more straightforward to manufacture, a goal of the present invention is to create an array design that can implement IMC in a either a small or large array format and be easily implemented in an electro-optical ("EO") aerial reconnaissance system. Utilizing the present invention, an aerial reconnaissance system user can perform forward oblique reconnaissance scenarios in a straightforward manner. For side oblique scenarios, IMC can be implemented by combining the row segmentation focal plane architecture used in forward oblique scenarios with the column segmentation techniques mentioned above. IMC can also be performed in a side oblique scenario utilizing a row-segmented focal plane array in combination with a moving focal plane shutter.

Further, the present invention can be implemented in an EO reconnaissance system for forward oblique operation that does not rely on a focal plane shutter to perform IMC. In particular, a CCD array can be arranged in a variable number of horizontal (or row) segments. In situations where IMC is needed, a variable frequency clocking method is applied to all the rows in the CCD array. Specifically, all horizontal rows are clocked with the same driving waveforms and electronics, but the frequency of clocking is varied as a function of the relative motion rates of objects contained in the scene of interest traversing the focal plane. IMC for the forward oblique mode of operation is obtained by synchronously clocking each row segment with a selected frequency. In side oblique operations, a focal plane shutter can be utilized to improve IMC according to the present invention. The manner in which this is accomplished is described in detail below.

2. System Overview

Before describing the invention in great detail, it is useful to describe a system overview of the present invention in terms of an example environment in which the invention can be implemented. In the broadest sense, the invention can be implemented in any electro-optical reconnaissance system. One such environment is in the field of aerial reconnaissance.

Typically, aerial reconnaissance missions are performed utilizing a variety of reconnaissance orientations where the image motion of objects contained in the scene of interest plays a significant role in overall image quality. For example, image motions are encountered when the reconnaissance camera is looking directly downward (vertical orientation), looking toward one side (side oblique orientation), and looking forward at a selected angle of depression from the horizon (forward oblique orientation). The image motions resulting from these reconnaissance scenarios are illustrated in FIG. 1A.

In FIG. 1A, the rectangular focal plane array is shown as projected on the ground. The relative magnitude and direction of the image motion within the frame is indicated by the length and direction of the motion-indicating arrows. In the vertical example 101, all of the motion is of a singular direction and magnitude. As such, all the parts of the image move together, parallel to the line of flight. This motion is uniform in magnitude throughout the frame.

In the side oblique 102 and forward oblique 103 cases, the motion component parallel to the line of flight is the dominant cause of image smearing. In either oblique case 102 or 103, scene objects nearest the aircraft appear to move faster while those further away move more slowly. The oblique examples 102 and 103 from FIG. 1A are complex in that a second motion component that varies with the half angle of the horizontal field of view (FOV) causes skewing of the motion direction. The skewing component typically does not require compensation since its magnitude is much lower than the component parallel to the line of flight.

Figure 1B:
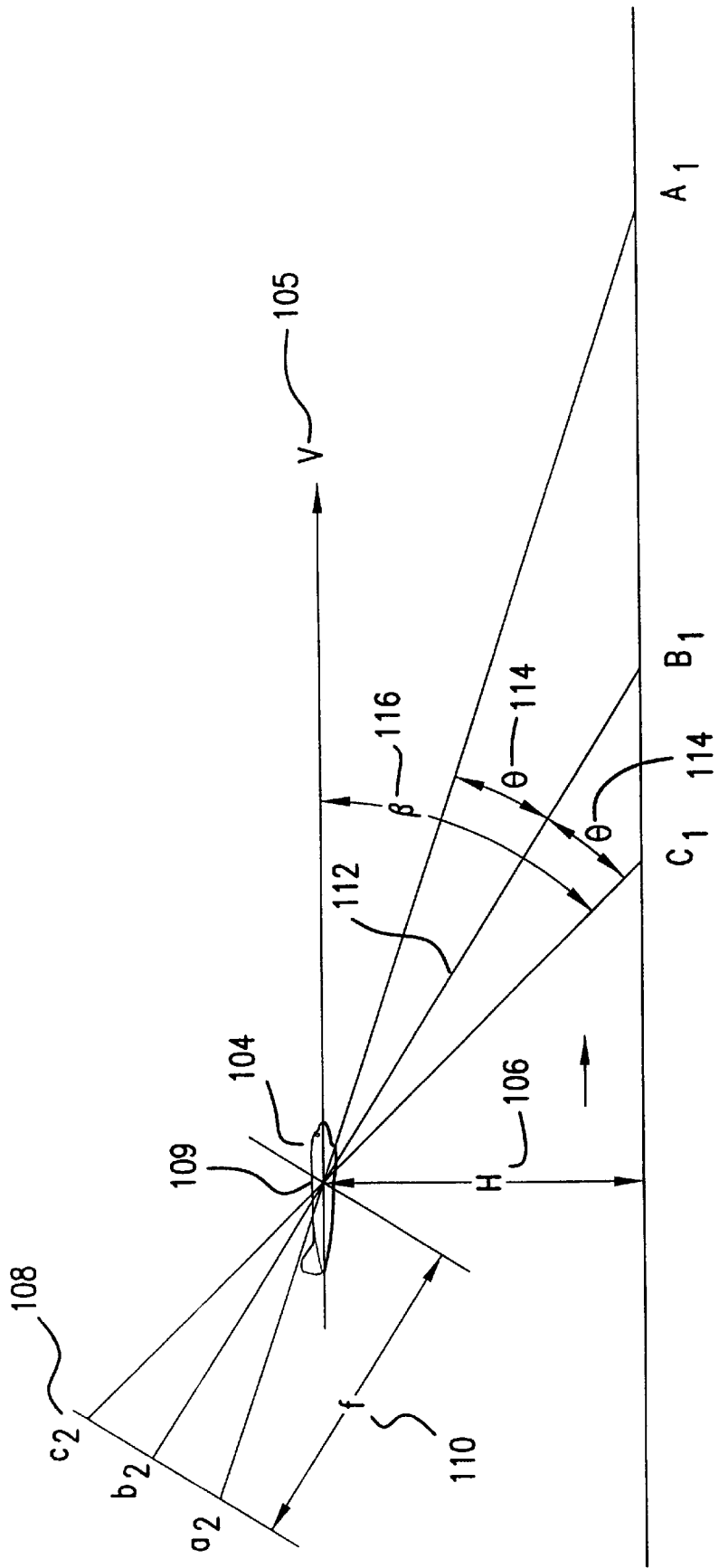

FIG. 1B provides a two dimensional illustration of an example environment for an aerial EO reconnaissance system operating in the forward oblique viewing mode discussed above. For the purposes of this example environment, assume that an imaging focal plane array reconnaissance system is contained in aircraft 104, which travels along a level flight path of a constant velocity given by velocity vector (V) 105. The altitude or height (H) 106 of aircraft 104 remains constant as well in this example. For purposes of this illustration, the focal plane array is located lying along plane 108, perpendicular to the optical axis, at a distance corresponding to the focal length (f) from focussing lens 109 of the imaging system. Assume also that the focal plane array "sees" three objects contained in the scene, A1, B1, and C1. These objects A1, B1, and C1 are imaged onto the focal plane array (as shown by the corresponding points a2, b2, and c2) at plane 108 by a focusing lens 109. Thus, the points a2, b2, and c2 define a format height of the focal plane array. As discussed above, near field objects, such as C1, will appear to have a faster relative motion rate to the focal plane array than far-field objects, such as A1. Thus, IMC will be necessary in order to prevent "smearing" of the image.

In order to calculate the appropriate IMC necessary for the reconnaissance system, several other parameters must be defined and incorporated into the IMC calculations. The line connecting points B1 and b2 defines an optical axis 112 of the imaging array system. A field of view (FOV) in the vertical direction of the system is defined by half-angles θ

114 of the focal plane array system. Angle β 116 represents a depression angle of the focal plane array camera, which is defined by the angle between the flight path 104 of the aircraft and the optical axis 112 of the imaging array system. Thus, the objects contained in the image rendered onto the focal plane array will depend on the depression angle and the FOV of the focal plane array system.

Figure 2:
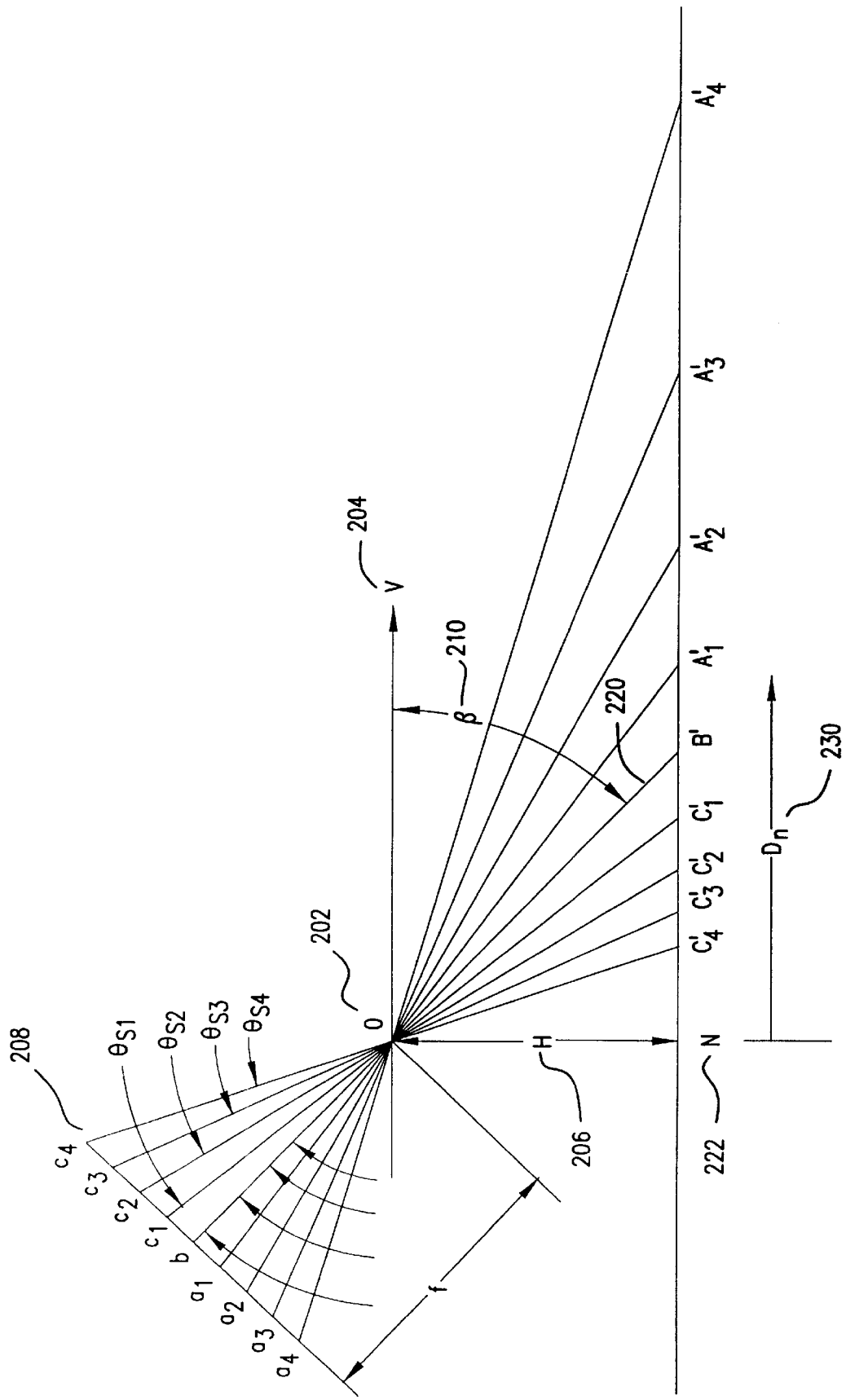
FIG. 2 represents a more detailed view of FIG. 1B, where 8 image segments of the scene are indicated.

FIG. 2, which represents a more detailed view of FIG. 1, illustrates the important nature of the above mentioned parameters in determining the appropriate IMC for a reconnaissance system. In FIG. 2, assume that an aircraft, located at object point O (202), travels in a level flight path over level terrain at a constant velocity and height. Again, V (204) and H (206) represent the aircraft's velocity and altitude, respectively, and β represents the focal plane array camera's depression angle. The aircraft's position along the ground is given by the Nadir point N (222), which represents the point directly beneath the aircraft.

Here, a4 and c4 designate the limits of the vertical FOV of the system and thus represent the boundary points encompassing all objects contained in the scene strip below and along the flight direction of the aircraft. Objects left and right of the central region of the scene are seen as images within the horizontal FOV extending along the row direction of the focal plane array. Thus, the focal plane array lying in plane 208 can be broken into 8 separate image segments of equal area, which correspond to segments with heights a4–a3, a3–a2, etc. The camera optical axis is defined by the line B-O-b. θsn (i.e., $\theta_{s1}$, $\theta_{s2}$ etc.) represents the FOV angle values corresponding to the boundaries of each row segment. When the horizontal FOV is small, i.e., less than ±10°, simple geometry allows for the calculation of a distance Dn from point N (222) to any segment boundary location as projected at ground level. The Dn value is determined by:

$$Dn = H/\tan(\beta \pm \theta sn)$$

Thus, once these ground segment distances are determined, the rate at which the points on the ground pass the aircraft can be calculated as a function of the altitude (H) and the velocity (V) of the aircraft. These calculations can be performed using processing circuitry (described below in section 3) incorporated in a reconnaissance system.

A simple flight scenario is provided below in Table 1. For this example, assume that all of the flight parameter values can be preset for the reconnaissance mission. For example, assume that the aircraft travels at a constant velocity V=1000 feet per second and at a constant height H=1000 feet. For an imaging system including a 3 inch×3 inch focal plane array format area and a 3 inch focal length lens, oriented at a depression angle β=45°, the fourth column of Table 1 shows that the distance along the ground corresponding to segment A4–A3 is 800 feet. Thus, as shown in the fifth column of Table 1, the time taken to traverse this differential distance is 800 ms. In contrast, the length of segment C3–C4 is only 122 feet, and the time taken to traverse this segment is only 122 ms. Thus, the rate of motion to traverse the focal plane array of objects contained in segment C3–C4 is almost 8 times faster than for objects contained in segment A4–A3. Hence, Table 1 illustrates the disparity in relative rates of motion for objects contained in a scene in a focal plane array reconnaissance system operating in a forward oblique mode.

TABLE 1

Worksheet for Time to Traverse Segments

Determine distance between segments $$D_n = \frac{H}{\tan(\beta \pm \theta_{Sn})}$$
where $D_n$ is distance from ground Nadir point below aircraft to FOV point on ground Conditions: β = 45°, H = 1000', V = 1000'/sec
3 inch lens focal length, 3 × 3 inch focal plane format with eight row segment regions each ⅜" high.

Step #1: Find angles $\theta_{Sn}$ at FOV format heights Sn of 0.375, 0.75, 1.125, and 1.5 inches.
$\theta_{Sn}$ = arc tan (Sn/3)

Step #2: Solve for β = $\theta_{Sn}$, the angle between FOV limit lines 0 to A'n and the terrain line A'n to N.

| FOV Point | β ± $\theta_{Sn}$ | H / tan(β ± $\theta_{Sn}$) | $\Delta D_{Sn}$ | $T_{Sn}$ @ 1000'/sec (milliseconds) |
|---|---|---|---|---|
| A4 | 18.44 | 3000 | | |
| (A4, A3) avg | | 2600 | 800 | 800 |
| A3 | 24.44 | 2200 | | |
| (A3, A2) avg | | 1934 | 533 | 533 |
| A2 | 30.96 | 1667 | | |
| (A2, A1) avg | | 1477 | 381 | 381 |
| A1 | 37.88 | 1286 | | |
| (A1, B) avg | | 1143 | 286 | 286 |
| B | 45.00 | 1000 | | |
| (B, C1) avg | | 989 | 222 | 222 |
| C1 | 52.13 | 778 | | |
| (C1, C2) avg | | 689 | 178 | 178 |
| C2 | 59.04 | 600 | | |
| (C2, C3) avg | | 528 | 145 | 145 |
| C3 | 65.56 | 455 | | |
| (C3, C4) avg | | 394 | 122 | 122 |
| C4 | 71.57 | 333 | | |

According to the present invention, the focal plane array rows are arranged into a number of row segments, where each row segment corresponds to a separate clocking section. In order to provide IMC, the shifting (or transfer of charge) of rows in each row segment corresponds to the image motion rates that exist in each segment. A detailed description of the layout of the focal plane array rows into row segments is set forth below in section 6, in connection with FIG. 7.

Table 2 illustrates the calculation of IMC Segment clock frequencies for an example focal plane array. Table 2 incorporates the data listed in Table 1 in order to calculate an appropriate row shift rate that compensates for the relative image motion of objects contained in the scene. For the purposes of Table 2, assume that the focal plane array comprises a 9216 pixel by 9216 pixel array. Thus, if the array is broken up into 8 equal height row segments, each row segment will consist of 1152 rows. The second column of Table 2 (ΔD) corresponds to the fourth column of Table 1, i.e., the differential distance of each segment. The third column of Table 2, ΔDrow (avg.), is the differential distance divided by the number of rows in the segment. The ΔDrow (avg.) is used to determine a F shift (avg.), which is the row/second shift shown in the fourth column of Table 2. The F shift (avg.) value is then used to determine the percentage of error (fifth column, Table 2) that corresponds to the motion rate of objects across that particular row segment. In other words, with IMC error, image quality would be reduced (due to smearing) proportional to the error value.

TABLE 2

Worksheet for IMC Segment Clock Frequencies

8 segments  9216/8 = 1152 rows/segment
$\Delta D_{ROW}(avg) = \Delta D/1152$ feet
F shift, rows/sec @ 1000'/sec = $1000/\Delta D_{ROW}(avg)$ $$\text{Error} \pm \% = \frac{100}{2} \times \frac{(f_{\text{shift max}} - f_{\text{shift min}})}{f_{\text{shift avg}}}$$

| Segment | ΔD, feet | $\Delta D_{ROW}$(avg), feet | F shift (avg), rows/sec. @ 1000'/sec | Error, % |
|---|---|---|---|---|
| A4, A3 | 800 | 0.694 | 1441 | ±15.8 |
| A3, A2 | 553 | 0.463 | 2160 | ±14.0 |
| A2, A1 | 381 | 0.331 | 3021 | ±13.2 |
| A1, B | 286 | 0.248 | 4032 | ±12.7 |
| B, C1 | 222 | 0.193 | 5181 | ±12.7 |
| C1, C2 | 178 | 0.154 | 6494 | ±13.1 |
| C2, C3 | 145 | 0.126 | 7937 | ±14.0 |
| C3, C4 | 122 | 0.105 | 9524 | ±15.9 |

In order to reduce image smear, according to the present invention, the focal plane array is clocked such that the rows shift at the same rate as objects appear to move across the row. Additionally, these row segments are shifted in synchronism with the image motion. However, since the motion varies across each row within a particular row segment, each row segment is clocked at a constant rate corresponding to an average value of the image motion across each row. For example, as shown in Table 2, the F shift (avg.) value for segment A4,A3 is 1441 and the F shift (avg.) value for segment A3,A2 is 2160. These values correspond to the image motion rate found at a midpoint of that particular row segment. Clearly, if more row segments are established (e.g., 16 row segments instead of 8 row segments), less error is obtained. This error reduction is illustrated graphically in FIG. 3.

Figure 3:
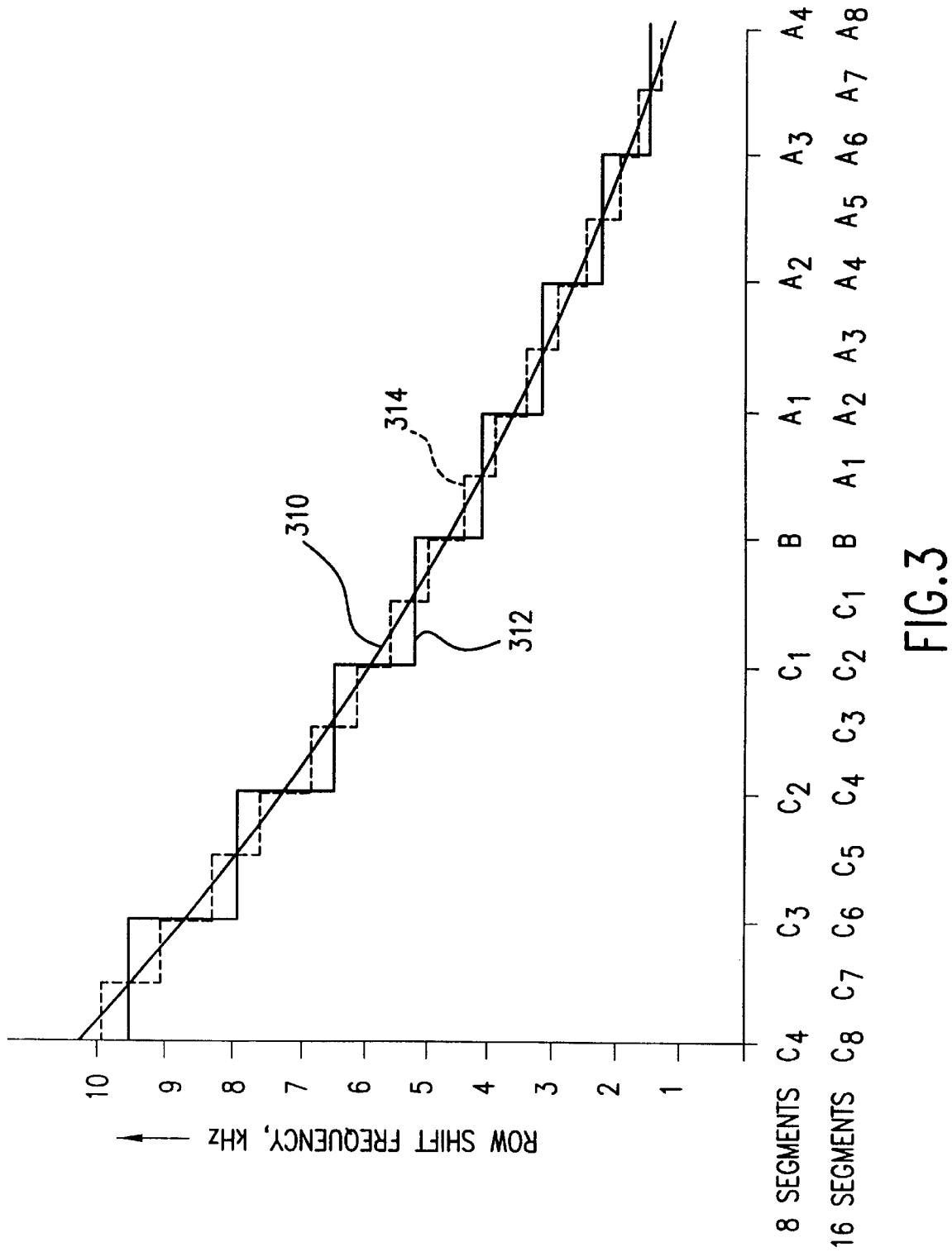
FIG. 3 illustrates the row shift frequencies required for image motion compensation for a focal plane array divided into 8 segments (solid-line) and 16 segments (dotted-line)

FIG. 3 illustrates that by increasing the number of row segments to be separately clocked in a focal plane array, the error (i.e., the difference between the actual image motion rate across a row segment and the row shift average value rate) is reduced by a corresponding amount. FIG. 3 plots the row shift frequency (in KHz) as a function of the number of row segments utilized on the focal plane array. For a focal plane array with 8 row segments (solid-line 312), each row segment is shifted at a constant rate that is determined in Table 2. For a focal plane array with 16 row segments (dashed-line 314), each row segment is shifted at a constant rate that is determined in Tables 3 and 4 (described in detail below). The variance of the row shift frequencies from the actual image motion rate (solid-line 310) is significantly less (approximately a factor of 2) for the 16 row segment case as opposed to the 8 row segment case. Thus, the number of row segments can be chosen to yield an acceptable error rate for the reconnaissance mission. This choice also depends on factors such as exposure time.

TABLE 3

Worksheet for 16 Segments (576 rows/segment)

| FOV Point | $\beta \pm \theta_{Sn}$ | $\frac{H}{\tan(\beta \pm \theta_{Sn})}$ | Time to Traverse Segment, ms | Clock Frequency (Hz) | Error % |
|---|---|---|---|---|---|
| A8 | 18.44° | 3000 | | | +7.4 |
| (A8, A7) avg | | 2778 | 444 | 1297 | 0 |
| A7 | 21.37 | 2556 | | | −8.7/+7.5 |
| (A7, A6) avg | | 2378 | 356 | 1618 | 0 |
| A6 | 24.44 | 2200 | | | −8.1/+7.1 |
| (A6, A5) avg | | 2055 | 291 | 1979 | 0 |
| A5 | 27.65 | 1909 | | | −7.7/+6.8 |
| (A5, A4) avg | | 1788 | 243 | 2370 | 0 |
| A4 | 30.96 | 1667 | | | −7.3/+6.6 |
| (A4, A3) avg | | 1564 | 205 | 2810 | 0 |
| A3 | 34.39 | 1461 | | | −7.1/+6.3 |
| (A3, A2) avg | | 1374 | 176 | 3273 | 0 |
| A2 | 37.88 | 1286 | | | −6.8/+6.3 |
| (A2, A1) avg | | 1210 | 152 | 3790 | 0 |
| A1 | 41.43 | 1133 | | | −6.8/+6.2 |
| (A1, B) avg | | 1067 | 133 | 4331 | 0 |
| B | 45.00 | 1000 | | | −6.7/+6.3 |
| (B, C1) avg | | 941 | 118 | 4881 | 0 |
| C1 | 48.59 | 882 | | | −6.7/+6.3 |
| (C1, C2) avg | | 830 | 105 | 5486 | 0 |
| C2 | 52.13 | 778 | | | −6.7/+6.4 |
| (C2, C3) avg | | 731 | 93.6 | 6154 | 0 |
| C3 | 55.63 | 684 | | | −6.9/+6.5 |
| (C3, C4) avg | | 642 | 84.2 | 6841 | 0 |
| C4 | 59.04 | 600 | | | −7.0/+6.8 |
| (C4, C5) avg | | 562 | 76.2 | 7559 | 0 |
| C5 | 62.35 | 524 | | | −7.3/+6.9 |
| (C5, C6) avg | | 490 | 69.3 | 8312 | 0 |
| C6 | 65.56 | 455 | | | −7.7/+7.6 |
| (C6, C7) avg | | 423 | 63.2 | 9114 | 0 |
| C7 | 68.65 | 391 | | | −8.2/+8.0 |
| (C7, C8) avg | | 362 | 58.0 | 9931 | 0 |
| C8 | 71.57 | 333 | | | −8.7 |

The row shift frequency values for a focal plane array with 16 row segments are calculated in Tables 3 and 4, which utilize the same conditions as set forth above in the description of FIG. 2 (except that for this example, 16 segments are created on the focal plane array at plane 208) and Tables 1 and 2. The last column in Table 3 illustrates the error range for each segment when the clock frequencies are based on average motion rates for a particular segment. For example, the error value (column 6) at FOV point A8 is 7.4%. However, if row segment A8,A7 is clocked at a clock frequency of 1297 Hz (column 5), no error due to the motion of objects across that row segment exists at the midpoint of segment A8,A7.

Table 4 also illustrates the importance of IMC under example flight conditions. Additionally, the shutter time (time of exposure of the scene on the focal plane array) is included in Table 4 to demonstrate that under certain flight conditions, no significant image smear will take place. Thus, the fourth column of Table 4 shows the number of actual rows traversed by the moving image shifts that occur for a 2 millisecond (ms) exposure time. As a general rule, image smear will not be significant if the image traverses across less than two row spaces during the exposure interval.

TABLE 4

Worksheet for 16 Segments at 2 milliseconds exposure time

| Segment | Time to Traverse Segment, ms | Time to Traverse row (avg.), ms | Number of Rows Traversed at $t_{exp}$ = 2 ms | Segment Clock Frequency (Hz) | Max no. of Smear Rows with IMC & $t_{exp}$ = 2 ms |
|---|---|---|---|---|---|
| (A8, A7) avg | 444 | 0.77 | 2.6 | 1297 | 0.13 |
| (A7, A6) avg | 356 | 0.62 | 3.2 | 1618 | 0.16 |
| (A6, A5) avg | 291 | 0.51 | 3.9 | 1979 | 0.20 |
| (A5, A4) avg | 243 | 0.42 | 4.8 | 2370 | 0.24 |
| (A4, A3) avg | 205 | 0.36 | 5.6 | 2810 | 0.28 |
| (A3, A2) avg | 176 | 0.31 | 6.5 | 3273 | 0.33 |
| (A2, A1) avg | 152 | 0.26 | 7.7 | 3790 | 0.39 |
| (A1, B) avg | 133 | 0.23 | 8.7 | 4331 | 0.44 |
| (B, C1) avg | 118 | 0.21 | 9.5 | 4881 | 0.48 |
| (C1, C2) avg | 105 | 0.18 | 11 | 5486 | 0.55 |
| (C2, C3) avg | 93.6 | 0.16 | 13 | 6154 | 0.65 |
| (C3, C4) avg | 84.2 | 0.15 | 13 | 6841 | 0.65 |
| (C4, C5) avg | 76.2 | 0.13 | 15 | 7559 | 0.75 |
| (C5, C6) avg | 69.3 | 0.12 | 17 | 8312 | 0.85 |
| (C6, C7) avg | 63.2 | 0.11 | 18 | 9114 | 0.90 |
| (C7, C8) avg | 58.0 | 0.10 | 20 | 9931 | 1.00 |

For example, the fourth column of Table 4 represents the "Number of Rows Traversed" for a 2 ms exposure time. For this fast exposure interval (e.g., 2 ms), image smear exceeds the two row space criteria for all segments when IMC is not implemented. With IMC, according to the example description, the motion smear is fully compensated near the mid region of each segment. Additionally, the clock frequency tolerance error, which does not exceed 10%, acts to limit smear at the first and last rows of each row segment. For example, referring to column 4 of Table 4, the smear without IMC for segment C7–C8 is 20 row spaces. With IMC correction at mid range, smear rows are reduced to 10% of the ±10 range of row spaces for segment C7–C8, i.e., to approximately less than one row space. Accordingly, exposure times can be as long as 4 ms without exceeding the smear limit criteria.

Thus, the above tables can be utilized in preprogramming an EO reconnaissance system to perform IMC. In particular, various reconnaissance scenarios can be stored into memory units of a reconnaissance system, whereby a particular set of image motion rates can be utilized to generate appropriate IMC clocking signals driving a focal plane imager, depending upon the flight parameters of a particular reconnaissance mission. The manner in which these image motion rates are incorporated into a reconnaissance system is described in detail below.

The present invention is described in terms of this example environment. Description in these terms is provided for convenience only. It is not intended that the invention be limited to application in this example enviromnent. In fact, after reading the following description, it will become apparent to a person skilled in the relevant art how to implement the invention in alternative environments.

3. Reconnaissance System

Although the invention can be utilized with numerous different electronic components, a preferred reconnaissance system configuration is provided below. After reading this description, it will become apparent to those skilled in the art how to implement the invention using alternative reconnaissance system configurations.

Figure 4:
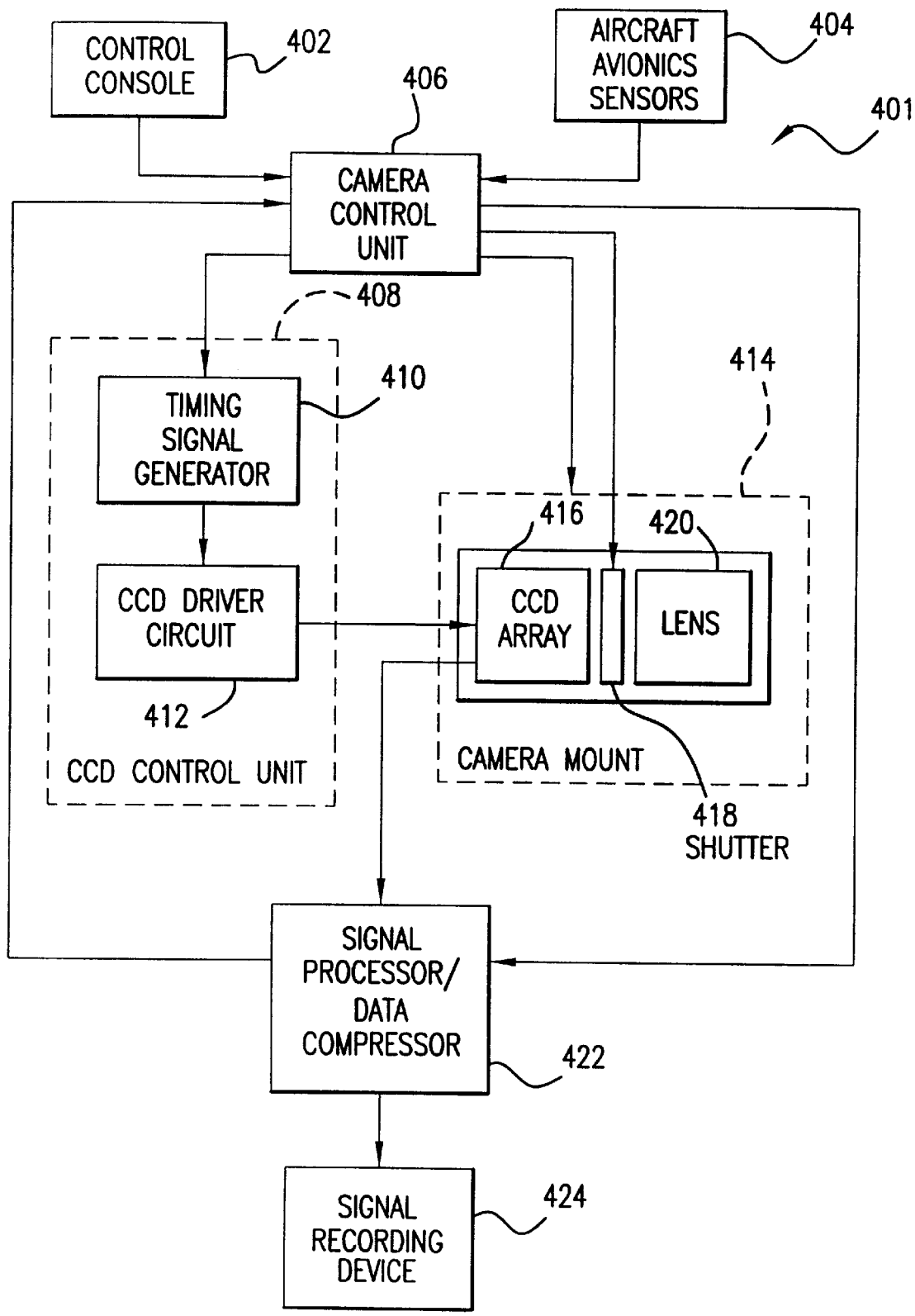
FIG. 4 is a block diagram of the electro-optical reconnaissance system according to the present invention.

FIG. 4 provides a block diagram of an EO reconnaissance system utilizing a row segmented, parallel-clocked CCD. Assume that electro-optic reconnaissance system 401 is utilized in a flight scenario similar to that described above for FIG. 2.

A control console 402, part of an on-board computer (not shown) receives mission programming information (e.g., velocity, height, etc.) from the operator of an aircraft. In addition, control console 402 sends this mission programming information to a camera control unit 406. A number of aircraft avionics sensors 404 additionally provide further mission parameters to camera control unit 406. These further mission parameters can include aircraft perturbations such as pitch, roll, or yaw, as well as updates on the critical velocity/height ratio.

According to one embodiment, camera control unit 406 can continuously process these input mission parameters in order to determine an appropriate image motion compensation (IMC) clocking signal corresponding to these mission parameters. As discussed above, a memory unit (not shown) can be preprogrammed with various image motion rates resulting from a particular set of mission parameters. For example, the memory unit can have the form of a lookup table utilized in a software routine to provide image motion rates as a function of mission parameters. The motion rates stored in the memory unit, in conjunction with the processed flight parameter information, can be relayed to focal plane array driver circuitry (described below) to generate a set of IMC clocking signals that drive a focal plane imager. Alternatively, camera control unit 406 can be preprogrammed with specific mission information, without the need to continuously process current mission conditions.

A CCD array 416, described in detail in the next section below, is utilized as an imager in reconnaissance system 401. Lens 420 provides the focussing means for system 401. Lens 420 focuses a portion of the scene of interest onto CCD array 416, where the portion of the scene is defined by the field of view (FOV) of lens 420. Lens 420 can be a standard, off-the-shelf imaging optic, such as a high numerical aperture lens found in similar imaging systems. Alternatively, lens 420 can be a complex optical focussing system comprising a series of lenses and other focussing optics. Various types of complex optical focussing systems are known in the art.

A shutter 418 can also be implemented in the reconnaissance system according to the present invention. Shutter 418 controls the exposure of CCD array 416 to the scene of interest. Shutter 418 can function as a camera iris (open during an exposure and closed during the array readout).

While shutter 418 is open, CCD array 416 is exposed to the scene of interest. When shutter 418 is closed, CCD array 416 is no longer exposed to the scene. The time between the opening and closing of shutter 418 is referred to as the exposure time.

Alternatively, shutter 418 can function as a moving window or slit that scans the projected image of the target scene across CCD array 416. This type of moving window or slit is generally located at or near the focal plane array and is referred to as a focal plane shutter. The present invention can also be implemented with a "between-the-lens" shutter. These between the lens shutters are utilized with complex lens systems. Typically, a between the lens shutter is placed at the preferred location of the iris, in order to prevent vignetting effects.

For reconnaissance systems with moving shutters, such as the reconnaissance system described in the related provisional application "Improved Electro-Optical Reconnaissance System," by Coon et al., the position of shutter 418 across a CCD array, such as CCD array 416, can be monitored by camera control unit 406. In turn, camera control unit 406 can generate a signal that is sent to a CCD array control unit, such as CCD array control unit 408, indicating the position of shutter 418. The timing signal corresponding to the position of a scanning shutter 418 is generated by CCD array control unit 408. According to the present invention, the position of a moving shutter is considered an optional parameter in performing IMC.

A camera mount 414 houses CCD array 416, shutter 418, and imaging lens 420. Fixed and adjustable camera mounts are known in the relevant art. In a typical reconnaissance mission, the position of the camera mount 414 is pre-set prior to flight, corresponding to a selected depression angle. Alternatively, a moveable camera mount such as a gimbal mount, well known to those in the reconnaissance field, can be used as camera mount 414. If a moveable camera mount is utilized, the orientation of camera mount 414 can be controlled by camera control unit 406, where the specific orientation of camera mount 414 corresponds to mission programming information processed in camera control unit 406.

Focal plane (or CCD) array control unit 408 drives the main format area of CCD array 416 with calculated clocking signals to perform image motion compensation. CCD array control unit 408 includes a master timing signal generator 410 that comprises a crystal oscillator to provide an accurate, well-controlled stable frequency master clocking signal. In addition, circuit elements (not shown) are utilized to act as counters (e.g., divide-by circuits) in order to count events. The counters receive data signals from camera control unit 406 and generate clocking signals corresponding to the master timing signals generated by master timing signal generator 410 in order to provide the appropriate image motion compensation for reconnaissance system 401. Numerous types of counters are known in the art and are widely available.

CCD array control unit 408 ensures that all row segments of CCD array 416 are clocked in synchronism with master clock 410. Thus, all the frequencies of the separate parallel clocking signals (described above) will have relationships in a precise digital manner to master clock 410. These parallel clocking signals are generated by focal plane array (or CCD) driver circuit 412, which receives timing signals from master timing signal generator 410. CCD driver circuit 412 drives CCD array 416 with the aforementioned parallel clocking signals. The precise frequency (or number of cycles) comprising each clocking signal waveform is determined by a programmable logic element (not shown) that is part of CCD control unit 408. This programmable logic element is programmed with a set of conditions from which to determine what precise clocking frequencies to utilize for clocking each row segment, based on the information sent to CCD control unit 408 by camera control unit 406. A description of the parallel shift clocking of the CCD array is set forth below in connection with FIG. 6.

As shown in FIG. 4, a signal processor/data compressor 422 is used to process the charges transferred from the main format area of CCD array 416. Signal processor 422 utilizes well-know data processing programs to convert the output data stream from the serial registers of CCD array 416 into a digital image data signal. This digital image data signal is a digital representation of the image stored in the format area of CCD array 416. A signal recording device 424 records the digital image data signal for later display and analysis.

Figure 5:
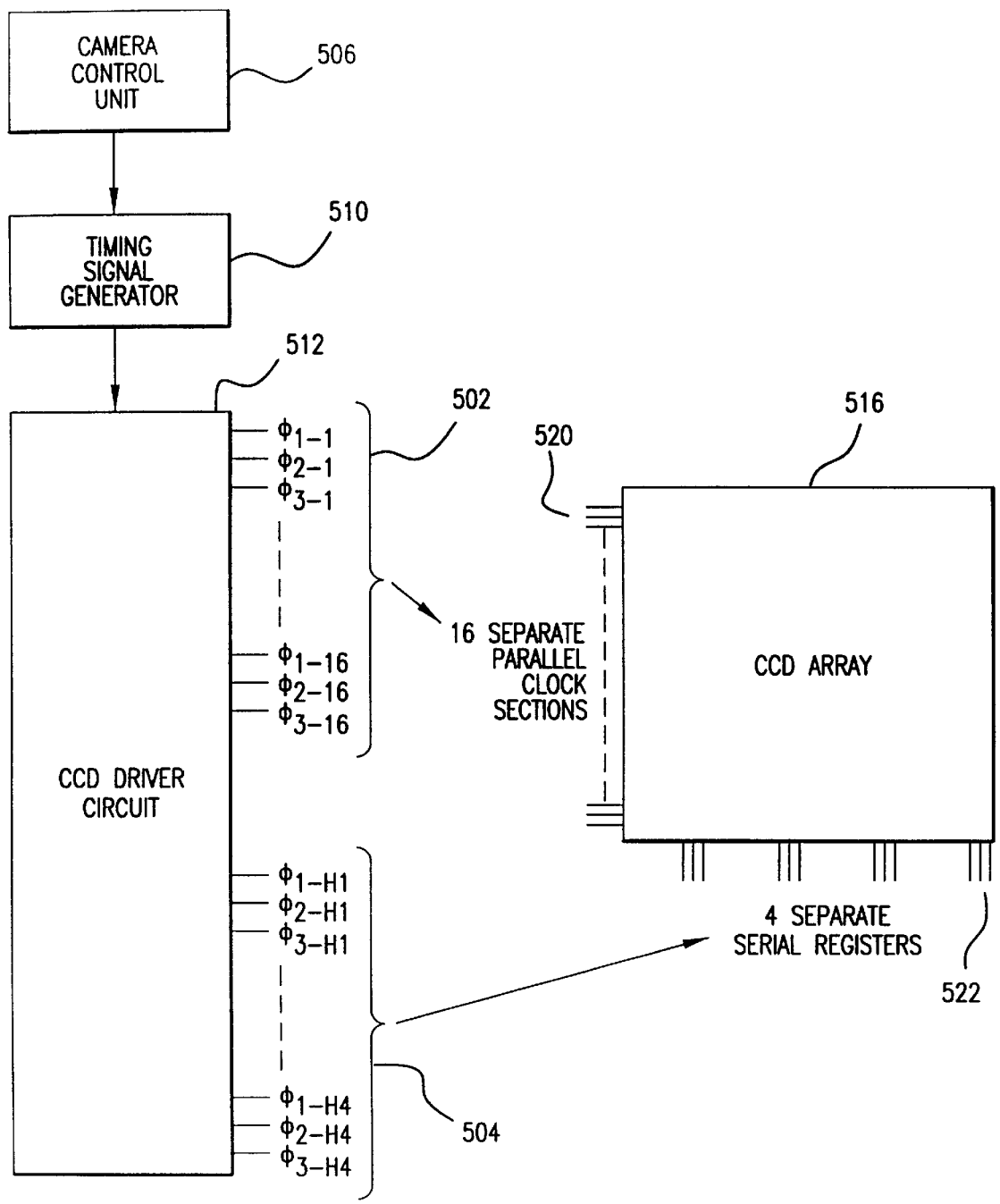
FIG. 5 is a block diagram of the focal plane control unit according to the present invention.

CCD driver circuit 412 is further illustrated in detail in FIG. 5. CCD driver circuit 412 includes a large number of signal outputs 502 corresponding to the number of row segments in CCD array 516. The driving signal is received at clocking inputs 520. The preferred embodiment of the present invention is based on a three phase array structure. Thus, each row segment receives a row (or vertical) clocking signal at inputs 520 comprising three phase components $\phi_{v1}$, $\phi_{v2}$, and $\phi_{v3}$ of a calculated number of cycles. Each of these phase components is approximately one hundred and twenty degrees out of phase from the other phase components of the clocking signal. In addition, CCD driver circuit 412 includes a number of signal outputs 504 corresponding to the number of separate serial registers 522. Each separate serial register receives a serial register (or horizontal) clocking signal comprising three phase components $\phi_{H1}$, $\phi_{H2}$, and $\phi_{H3}$ of an equal number of cycles. Each of the phase components of the serial register signal is one hundred and twenty degrees out of phase from the other phase components of the serial register clocking signal.

The present invention is described in terms of a three-phase clocking scheme for illustrative purposes only. Alternatively, the present invention can be utilized with other conventional clocking schemes (e.g., two-phase and four-phase structures). The array architectures based on these other conventional clocking schemes will be apparent to those skilled in the art based on the description of the present invention.

As mentioned above in reference to FIG. 4, commands sent from camera control unit 406 are received by master timing signal generator 410, which in turn generates the appropriate timing sequences read by CCD driver circuit 412. The parallel shift clocking signals are then sent to the appropriate separate clocking sections (row segments) of CCD array 416. Under normal IMC conditions, the number of separate clocking signals will directly correspond with the number of row segments found on CCD array 416. However, under other conditions, the present invention provides for a varying of the row segment arrangement through alterations in parallel clocking. In other words, while the physical structure of CCD array 416 determines a maximum number of row segments available, the effective number of row segments utilized for IMC is determined by camera control unit 406.

For example, in one reconnaissance scenario, the first four row segments of CCD array 416 can be clocked at the same clocking signal frequency, while the next four segments can be clocked at other frequencies. This type of clocking is useful for a reconnaissance system operating in the forward oblique mode that uses a wide angle lens to view both the horizon and directly below the aircraft. Alternatively, in the vertical orientation (described above in connection with FIG. 1A), the system can be viewing a target directly beneath the aircraft. Here, camera control unit 406 commands that the clocking of all row segments be done at the same rate (uniform IMC), since objects contained in the scene will have the same relative forward motion. Further, in a side oblique reconnaissance scenario (also shown in FIG. 1A), camera control unit 406 commands a moving shutter to traverse across CCD array 416 in conjunction with the clocking signals generated by CCD array control unit 408 to perform IMC.

Overall, the present invention provides for a number of commands to be generated by camera control unit 406, depending on the severity of the IMC problems and the type of image motions due to the forward motion of the aircraft. Thus, both the structure and the functionality of the present invention provide a user with the flexibility to operate the present invention according to wide range of IMC conditions.

4. CCD Arrays

As described above, a Charge Coupled Device (CCD) is the preferred imaging focal plane array utilized in the present invention. Basic CCD architectures, designs and functionality are known in the art and are fully described in numerous texts and articles. For example, the reader is referred to "Solid-State Imaging with Charge-Coupled Devices," by Albert J. P. Theuwissen, Kluwer Academic Publishers (1995), which is incorporated by reference herein. However, for the reader's convenience, a brief description of the fundamental processes of CCDs is provided below.

CCDs are solid-state devices that typically comprise an array of closely-spaced photosensitive cells or pixels arranged in rows and columns. As radiation (e.g., ultraviolet, visible, or infrared light) from a scene impinges these cells, an electronic representation of an image is formed when incident photons create electron-hole pairs within the individual photosites. Subsequent charge carriers, typically electrons, are collected locally in potential (collecting) wells by the bias action of three "V" (or row) electrodes and the column boundaries formed by the P+ channel-stop implants. Each charge packet contains scene information that is eventually transferred from the collecting wells to either a storage section of the array (that is not exposed to the scene) or directly out of the array through various readout registers. From the readout registers, these charges are eventually converted to an electrical representation of the image through well known image processing techniques.

As previously described, controlled rates of charge packet transfer are used to provide IMC during the exposure interval. However, charge transfers following the exposure interval must be shielded from light by a shutter to avoid contamination from spurious light signals. Fast-moving shutters that traverse the CCD array can limit the exposure time of each pixel to reduce image motion smear. However, shutter speeds are subject to mechanical limits. In addition, because the relative motion rates of objects contained in the scene of interest are different depending on their near-field or far-field locations, shutter speeds would have to be varied accordingly to compensate for the image smear or blurring. As described below, the present invention provides IMC in the forward oblique orientation independent of instantaneous shutter speed during the exposure interval.

5. Clocking of Array

Figure 6:
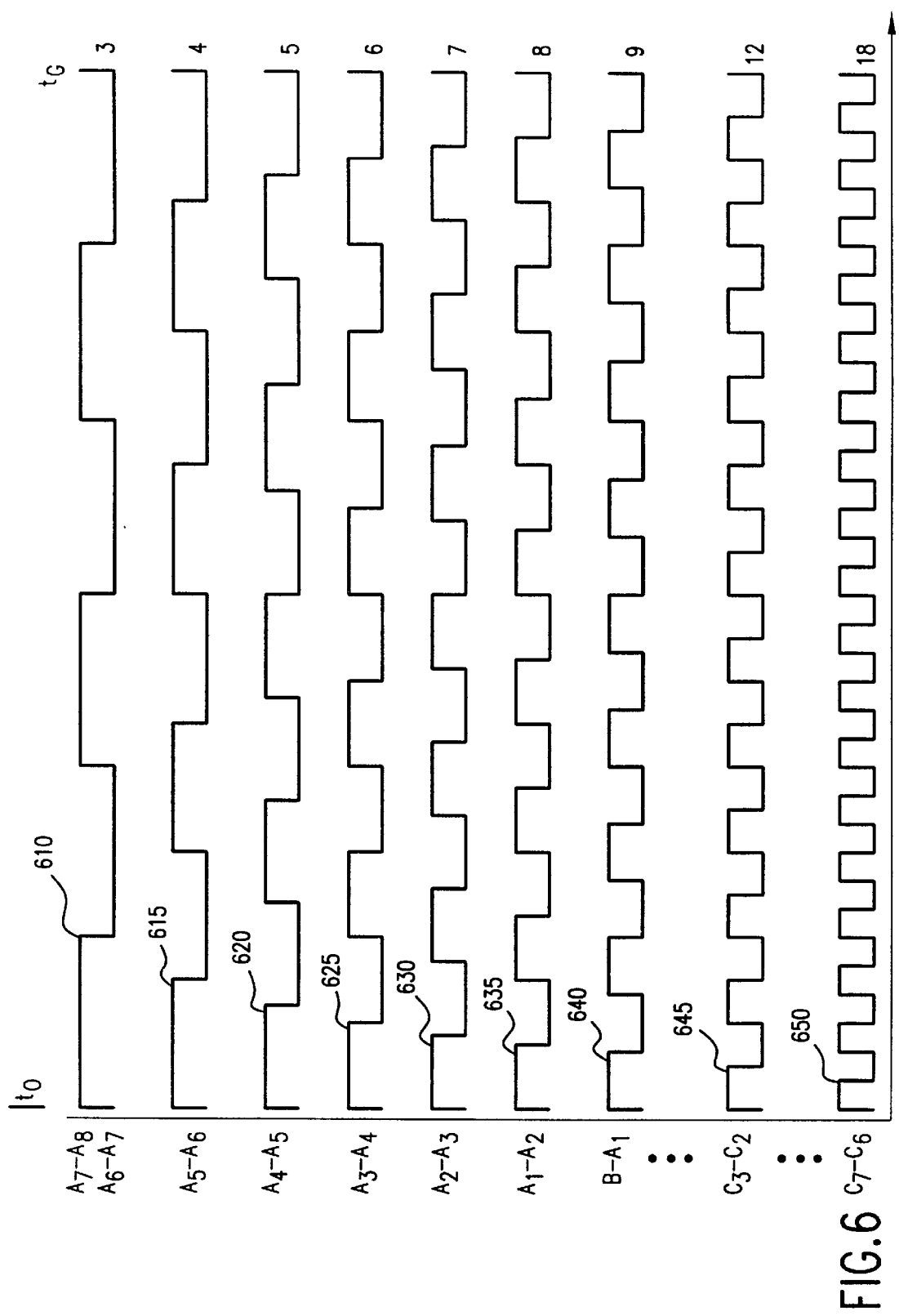
FIG. 6 is a schematic diagram of a single phase component of the IMC clocking signals sent to the focal plane array.

The present invention compensates for the relative motions of near-field and far-field images contained in the scene by arranging the CCD array into a number of row segments, which correspond to separate parallel clocking sections of the array. As illustrated in FIG. 6, a variable frequency clocking signal is applied to all the rows in the CCD array. Assuming the same flight parameters as utilized in the description of FIG. 2 above, the rows of a CCD array are arranged in sixteen row segments. In one embodiment of the present invention, each row segment is clocked at a different rate to compensate for the image motion of objects contained in the portion of the scene focussed onto that row segment. However, as explained below, each row segment is still synchronously clocked with the other row segments in order to prevent a mismatch in charge transfer.

For simplicity, FIG. 6 displays a variable clocking waveform for a single phase of the three-phase clocking signal, e.g. $\phi_{v1}$, that is applied to each individual row segment or clocking section of the CCD. As mentioned above in connection with FIG. 4, these clocking signals are generated by a CCD array driver circuit 412. A row shift (or charge transfer) occurs at the end of one full cycle. For the purposes of FIG. 6, the row segments of the CCD range from A8 to C8, where the segment A8–A7 (row segment 1) includes the far-field objects furthest from the aircraft and C7–C8 (row segment 16) includes the near-field objects closest to the aircraft. For example, the $\phi_{v1}$ component of the clocking signal waveform applied to row segment 1, as well as row segment 2 (for segment A7–A6), is a low frequency signal (comprising 3 cycles) beginning at time $t_0$. This clocking signal is of lower frequency because the relative motion of the far field objects contained in this image segment is much slower than the rapidly moving objects contained in the near-field image segments. Thus, as illustrated by FIG. 6, the number of cycles in a clocking signal applied to a particular row segment increases corresponding to the rate of motion of objects contained in the portion of the scene focussed on that particular row segment.

It is important that all segments work in a synchronous fashion in order to avoid artifacts that occur as a result of not having a sufficiently wide well space at the transition from the $\phi_{v3}$ phase component of one row segment to the $\phi_{v1}$, phase component of the next segment. As shown in FIG. 6, the clocking of the CCD array's row segments is performed in a synchronous manner, with all of the $\phi_{v1}$, components of the clocking waveforms beginning in the same position at $t_0$ and ending in the same position at $t_f$. With non-synchronous clocking, a mismatch can occur leading to inefficient charge transfers. Additionally, as illustrated by the numbers shown on the right-hand side of FIG. 6, each clocking waveform (signals 610–650) also contains an integer number cycles. For example, the clocking signal 610 applied to row segments 1 and 2 contain three full cycles. The clocking signal 615 applied to segment 3 (A5–A6) comprises four full cycles. The clocking signal 650 applied to the next to last row segment (C7–C6, segment 15) comprises 18 cycles.

Overall, according to this embodiment of the present invention, the clocking signal applied to a particular row segment comprises an integer number of cycles. The clocking signal frequency (or number of cycles) increases corresponding to the individual row segment being clocked. The clocking signal with a fewest number of cycles clocks row segment 1 and the waveform with the greatest number of cycles clocks the last row segment (e.g., row segment 16). Additionally, a clocking signal of a given frequency can be applied to more than one row segment, depending on the calculated image motion rate for those particular row segments.

As mentioned above, the particular clocking signal frequency is determined by a logic element that is part of the CCD array control unit. The specific number of waveform cycles comprising each clock signal waveform corresponds to preprogrammed and/or continuously updated mission parameters (such as altitude, velocity, depression angle, FOV, pitch, roll, etc.) described above, as well as calculated relative image motion rates of objects contained in the scene of interest traversing the CCD array.

6. Array Implementation

Figure 7:
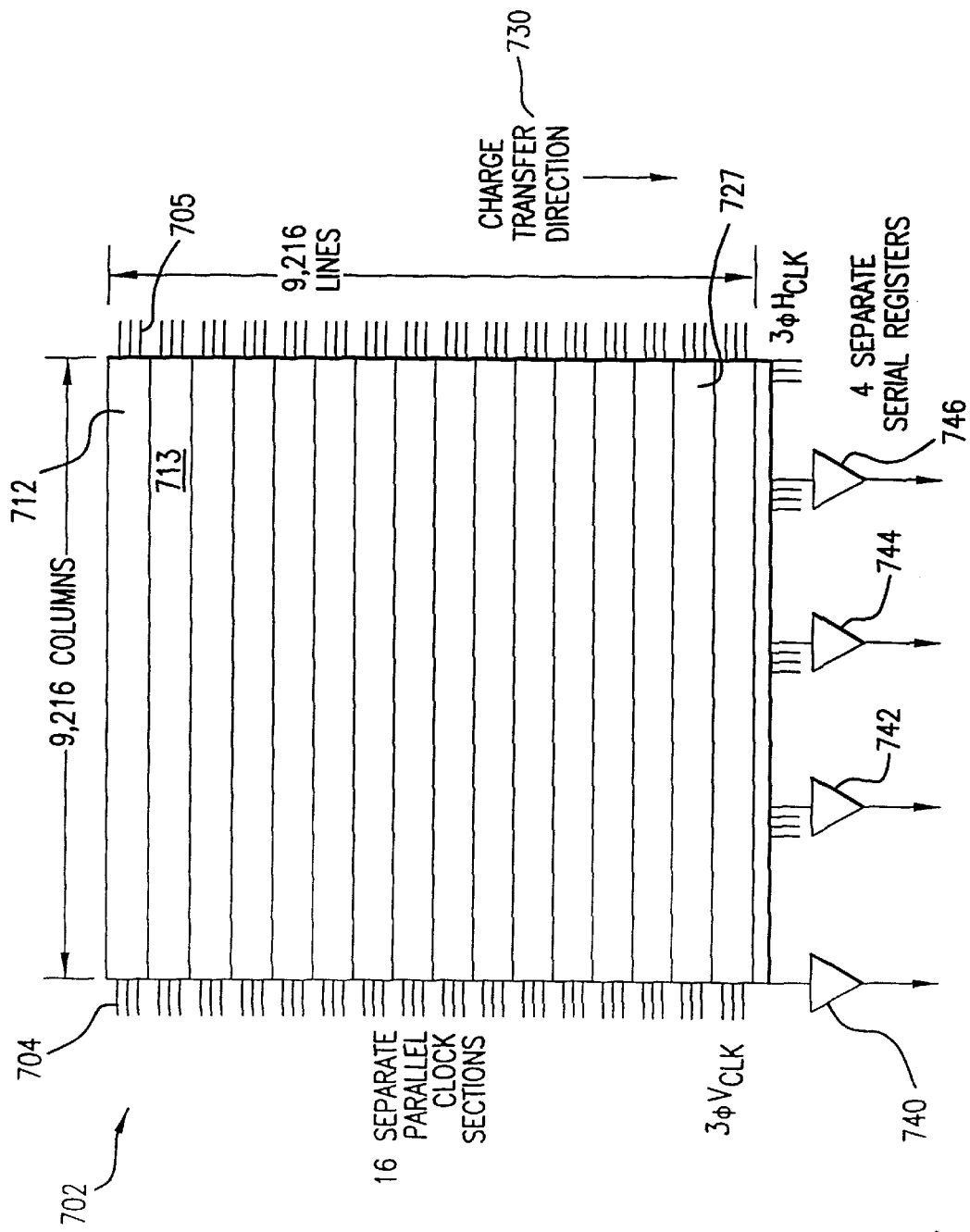
FIG. 7 is a block diagram of the 9216-by-9216 full frame row-segmented CCD according to one embodiment of the present invention.

FIG. 7 provides a functional block diagram of the preferred embodiment of the present invention, a 9216 pixel by 9216 pixel full frame CCD. In particular, the full-frame CCD imager has an 8.1 centimeter (cm) by 8.1 cm main format area containing an array of 9216×9216 pixels. The pixel size is approximately 8.75 micrometers ($\mu$m)×8.75 $\mu$m. The CCD array is arranged in 16 separate parallel clocking sections (or row segments). While the present invention is suitable for use in any size CCD array, the larger 9216 pixel×9216 pixel array is chosen as an example because the present invention represents a low cost approach to image motion compensation (IMC) in large scale CCD arrays. Additionally, although all embodiments are described in terms of CCD arrays, it would be straightforward for one skilled in the art to utilize the present invention in other types of focal plane array imagers, such as CMOS imagers or infrared focal plane array devices using, e.g., indium antimonide (InSb) arrays.

CCD 702 is designed according to the basic principles of CCD manufacture. Gate lines (not shown) are run across the entire format area, commutating with every pixel in each row. In a preferred embodiment, gate lines are accessed on both sides of the row electrodes. Referring to first row segment 712, three phase row clocking signals are applied on either side of row segment 712 at connection sets (or clocking pins) 704 and 705. Since CCD array 702 is large, both sides of each clocking section are accessed. Time delays are inherent in the array due to the distances each horizontal clocking line must traverse across the row segments. For example, it takes a finite amount of time for a clocking signal that is applied on one side of the row segment 712 at pins 704 to propagate down to the other end near pins 705. Thus, by applying the row clocking signal on both sides of a row segment, such as row segment 712, the time constant is cut in half. Physically, simultaneous clocking is achieved by strapping the horizontal clocking gate lines together and clocking row segment 712 with a common driver circuit (not shown). Strapping techniques, such as aluminization, are well known to manufacturers of CCD arrays. Additionally, both sides of CCD array 702 are accessed because of yield concerns (e.g., reliability) of large-scale CCD arrays. The chances of having a faulty performance CCD array is reduced by accessing both sides of each row segment.

Further reduction in time delays can be achieved by accessing gate lines with interconnects at intermittent points along each row and applying row clocking signals at these access points. For example, with a 9216×9216 pixel array, row clocking signals can be applied to each row after every 1000 columns in order to reduce time delays.

Thus, according to FIG. 7, each of the 16 separate row segments is identified with 16 separate connection sets. For simplicity, only three clock sets are shown, although inherent in this type of CCD array are hundreds of lines to be accessed in each segment, as well as interconnects on the CCD array. It should be noted that a CCD array with 16 row segments is only one embodiment of the present invention: any number of row segments or separate clocking sections can be chosen prior to the CCD manufacturing process based on reconnaissance mission requirements and manufacturing cost considerations.

For example, referring back to FIG. 6, clocking signal 610 is applied to row segment 712. Recall that row clocking signal waveform 610 consists of three cycles and is applied to each row in the row segment that images the far-field objects contained in a scene. Similarly, row clocking signal waveform 650 consists of eighteen cycles (the next to highest frequency clocking signal) and is applied to row segment 727, which images near-field objects contained in the scene of interest. These row segments are referred to as parallel clocking sections because the clocking signal shifts entire rows along the charge transfer direction 730, one clock cycle at a time, row-to-row in parallel moves.

The charges are eventually read out through serial registers 740, 742, 744, and 746 located at the bottom of CCD array 702. In this embodiment of the present invention, the sampling rate for each output is approximately 25 megapixels/second. Serial registers 740, 742, 744, and 746 include charge detector/amplifiers (not shown) that are designed to rapidly read out the charge signal packets.

All information contained in CCD array 702 eventually comes out as a serial data stream, one sample following another. All rows are read out in sequence through amplifiers 740, 742, 744, and 746, where the information is referred to as the output data stream. According to this embodiment of the present invention, four ports are utilized instead of one in order to extract the output data stream at a faster rate over the course of the same time interval. Conceivably, CCD array 702 can be designed to use a greater number of separate serial registers if the rate of horizontal readout needed to be increased.

As illustrated in FIG. 6, in normal operation, the progression of clocking cycles corresponds with faster and faster image motion rates. Thus, for optimal IMC operation, the slowest clock speed is applied to the row segment furthest from the serial register and the fastest clock speed is applied to the row segment closest to the serial register. For example, clocking signal waveform 610 drives row segment 712 and clocking signal waveform 650 drives row segment 727 in this embodiment of the present invention.

One major advantage of the present invention is that it is capable of providing sufficient IMC independent of the shutter exposure time interval. For example, when performing a reconnaissance mission in low light conditions, it is often necessary for the exposure interval to be increased in order to illuminate the imaging array with enough light to render an acceptable image. However, when image motion rates are increased due to the depression angle of the imaging system or an increased forward velocity of the aircraft, image smear is increased. In the preferred embodiment of the present invention, a narrowing of the shutter slit is not necessary to perform IMC: IMC is performed by the parallel shift clocking technique described above. While a shutter is still utilized in a forward oblique scenario to block light during the readout time of the CCD array, it is not required to be an integral part of the IMC of the reconnaissance system of the present invention.

7. Real Time Imaging With Parallel Shift Clocking IMC

As described above, the present invention represents an effective and straightforward approach to image motion compensation, especially when the reconnaissance system is operated in the forward oblique mode. One important flight scenario where this type of system operation is very useful is for the landing of an aircraft. In a landing mode operation, the present invention utilizes a reconnaissance system similar to the system illustrated in FIG. 4. However, the CCD array utilized in a landing mode operation must be capable of operating in a very fast readout mode, in order to provide real-time images to the operator of the aircraft. This fast readout mode of operation is also referred to as television mode operation.

For example, a 9216 pixel×9216 pixel CCD array will typically take approximately one second to perform a complete readout of all the information stored in the format area. A 500 pixel×500 pixel CCD array, on the other hand, is capable of a much faster readout rate: the readout rate of the imager take places at the same time the exposure takes place. Typical television rates are approximately 30 exposures per second, although other exposure rates are well known in the art. Additionally, in a television mode, a system cannot have a shutter open and then close to allow for the readout of the gathered image without a loss in sensitivity in proportion to the on/off ratios of focal plane illumination. Therefore, the CCD array is arranged so that format area comprises an imaging area that is exposed to the scene, and an adjacent image storage area that is light shielded. The preferred shutter mechanism in this embodiment of the present invention is a continuously rotating blade that blocks illumination for only a short time interval (e.g., 1 millisecond) required to shift charges from the image to the storage area.

This embodiment of the present invention is described in terms of a typical television frame rate of 30 exposures per second (sec.) for illustrative purposes only. After reading this description, it will become apparent to those skilled in the art how to implement the present invention using alternative exposure rates. In this embodiment of the present invention, the imaging area of the CCD that is exposed to the scene is arranged in a number of row segments or parallel clocking sections, in a similar manner as described above in connection with FIG. 7. However, the pixels comprising the image storage area are not required to be arranged in a number of row segments. After the imaging area is exposed to the scene, the adjacent storage area receives the image information in high speed image to storage area transfers occurring 30 times/sec., followed by readout from the storage area. During the exposure interval, charge packets are shifted within row segments and between row segments in accordance with previously described examples for IMC. As in conventional frame-transfer CCD architecture, the image storage area of the present invention is approximately equal in size to the imaging area.

For television mode operation, readout takes place during the exposure time of the imaging area. In this example, the exposure time is 1/30 sec. At the end of this 1/30 sec. interval, all of the rows of each parallel clocking section are shifted at very high speed shift into the image storage area. Preferably, the row shift occurs during a time interval much shorter than the 1/30 sec. exposure interval, such as a shift in 1/1000 sec. This duration is kept short to avoid loss of image information. Subsequently, the stored information is read out 1 row at a time using the entire 1/30 sec. exposure time interval. Preferably, the readout rate is also kept short in order to avoid image flicker on the operator's video screen. For example, a readout in 1/60 sec. can be used. Additionally, the camera control unit utilized in this embodiment of the present invention is configured to operate in an automatic or continuous operation mode.

8. Mosaic Implementation

Figure 8:
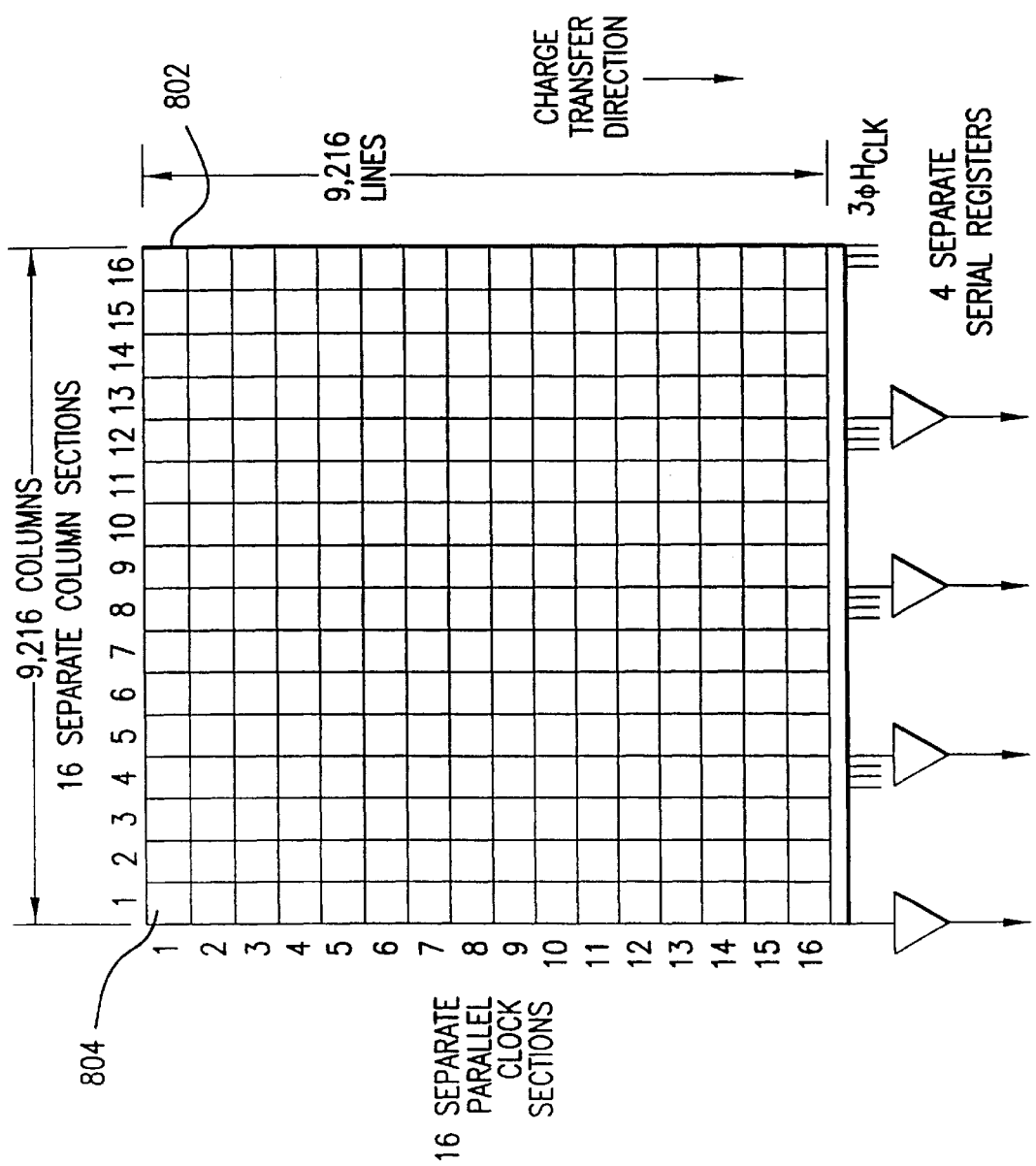
FIG. 8 is a block diagram of a full frame CCD with mosaic segmentation according to one embodiment of the present invention.
Figure 9:
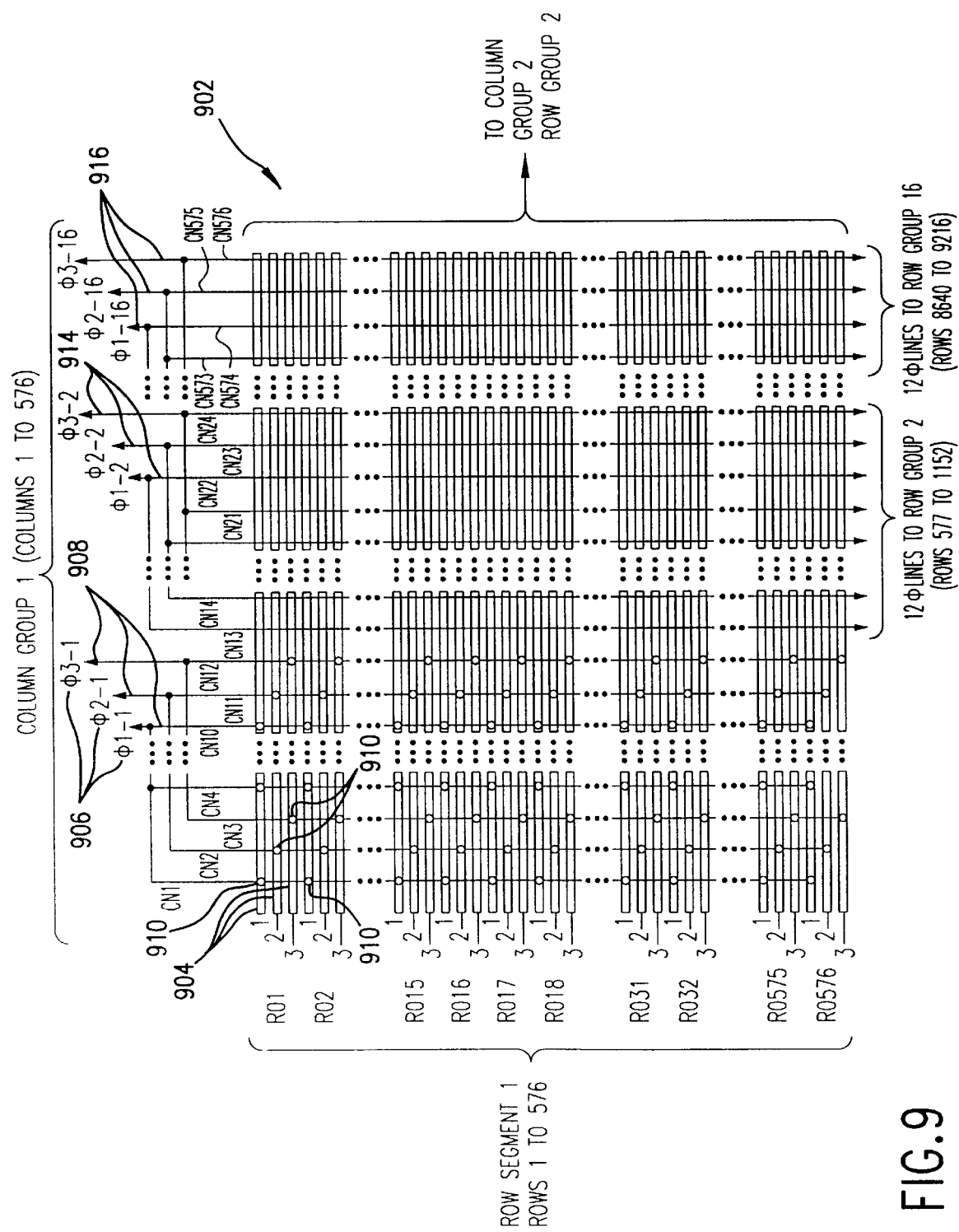
FIG. 9 is a schematic diagram of the access lines and contact regions for the parallel shift clocking of mosaic regions according to one embodiment of the present invention.

While the CCD array as illustrated in FIG. 7 is arranged in a predetermined number of row segments, FIG. 8 and FIG. 9 illustrate an alternative, mosaic embodiment of the present invention, where both the rows and columns of the CCD array are arranged in a predetermined number of row and column segments. FIG. 8 illustrates a block diagram of the mosaic embodiment of the present invention, where the main format area of CCD array 802 comprises 9216×9216 pixels and is arranged in 16 row segments (or parallel clock sections) and 16 column segments (or separate column sections). In other words, the main format area is subdivided into 16×16 mosaic regions. In this embodiment of the present invention, each mosaic region comprises 576 pixel rows and 576 pixel columns.

The present invention provides for independently selecting the rate of parallel shifting in any one of the mosaic regions. Similar to the row-segmented embodiment above, CCD 802 can operate variable frequency clocking in both the horizontal (row) or vertical (column) direction. By utilizing a similar clocking scheme as described above, this mosaic arrangement allows for image motion compensation in both the column and row directions, which corresponds to both the forward oblique and side oblique reconnaissance modes of operation. In principle, the present invention allows for a different clocking rate for every one of 16×16 mosaic regions.

Moreover, by having column segment connections in addition to row segment connections, IMC can be improved through higher frequency clocking of CCD array 802. For example, a mosaic implementation is required if the speed at which the charge packets are transferred along the columns becomes excessively high.

In order to access column segments individually, additional interconnects to the row gate lines (not shown) are added to the main format area. Thus, the design and manufacture of the mosaic embodiment is more complicated than the row-segmented embodiment of the present invention. The mosaic embodiment of the present invention requires implementing additional multiple feedlines in order to access all column segments as well as all row segments. For example, a CCD array in the mosaic implementation is designed to isolate the columns into groups, whereby each column group is fully isolated from neighboring column groups. This isolation prevents the additional interconnects from crossing over and mixing charges. In other words, isolating columns restricts the use of any cross-connects in the row direction from one group to a neighboring group. Thus, in order to access the row segments, clocking signals need to come down along column barrier implants (between columns), which act to prevent charges from crossing over to adjacent columns. These implants are designed to be as narrow as CCD manufacturing techniques permit in order to maintain a high area utilization factor.

For example, with a mosaic arrangement, independent clocking of the mosaic regions in any column segment requires three ($\phi_1, \phi_2, \phi_3$) gate drive lines for each of 16 mosaic regions, or 48 line sets. It is desirable to use these metal stripes over every channel stop to avoid non-uniformities in useful pixel width. For example, if a pixel space is 10 micrometers ($\mu$m) wide, and a 2 $\mu$m implant is utilized, the overall efficiency of the imaging pixel is reduced approximately 20 percent. Thus, for each 2 $\mu$m implant, a stripe of aluminum aligned with the implant is deposited along the total height of the CCD. In addition, only one phase line can be utilized over one column implant, resulting in the use of three column implants to bring the three phases of the column clocking signal down the array.

Further, additional contact holes (the locations where the metal makes contact to the underlying structures) are etched through the multiple photoresist layers to make the interconnects. In the mosaic implementation example of FIG. 8, each column segment requires 48 feedlines in order to access all 16 segments in the row direction, resulting in approximately 768 additional interconnects. While the fabrication complexity is increased for the mosaic implementation, the additional benefits of greater flexibility of reconnaissance operability are created.

FIG. 9 provides a detailed view of the above-mentioned access lines and contact regions for the parallel shift clocking of mosaic regions. In particular, this figure displays a single region 902, referred to as column group (1), row group (1) (or region 804 from FIG. 8). Thus, region 902 comprises 576 rows (from R01 to R576, or row group 1) and 576 columns (from CN1 to CN576, or column group 1). Note that the entire column group 1 (not shown) thus comprises parts of 16 row segments.

For example, each pixel in R01 is accessed by three phase (or gate) lines 904, which are driven by three-phase clocking signals 906. These clocking signals 906 contact each row phase line via gate drive lines 908 at contact points 910. Hence, for column group 1, $\phi_{1-1}$, $\phi_{2-1}$, and $\phi_{3-1}$ represent the 3 phase clocking signal applied to row group (1) (rows R01 to R576), whereas $\phi_{1-2}$, $\phi_{2-2}$, and $\phi_{3-2}$ represent the 3 phase clocking signal applied to row group (2) (rows R577 to R1152), and so on. Column group (2) is clocked in a similar manner, but with a different clocking waveform depending on the motion of objects imaged onto that column group.

Additionally, in the mosaic implementation, the row gate lines are only accessed from the top of the format area. Every mosaic region contains rows that are electrically connected to corresponding gate drive lines by lines that run along the column direction, as illustrated by FIG. 9. Thus, in column group 1, all rows R01 to R576 can be accessed by gate drive lines 908.

The function of the gate drive lines described above requires that they make electrical contact to the appropriate gate lines at the contact regions. In particular, since there are 48 sets of lines required for each column group, which in turn comprise 576 pixel columns, the maximum number of metal stripe locations for each phase line is 12. For example, gate drive lines 908 make contact with each row in row group (1). Similarly, gate drive lines 914 make contact with each row in row group (2), but make no contact with any rows in row group (1). Finally, gate drive lines 916 make contact with each row in the last row group (16), but make no contact with any rows in row groups (1–15). Similar to the embodiment of FIG. 7, row group (16) is located closest to the serial output register and is clocked with the highest frequency clocking signal. Thus, in a similar manner as described above for the forward oblique mode of operation, the mosaic embodiment of the present invention provides IMC in both the forward oblique and side oblique mode of operation. IMC is created independent of a moving shutter by the use of parallel shift clocking of different mosaic regions, as opposed to clocking row segments only.

It should be noted that FIG. 9 represents only one possible way to access gate drive lines using the present invention. In fact, numerous modifications of the arrangement shown in FIG. 9 are possible. For example, a particularly important modification is to intersperse line locations to achieve thruhole contacts at wide-spaced locations along the full length of the row gate lines. Other possibilities include reducing the number of active lines (i.e., those with thru-hole contacts) from twelve to a lesser number, not less than two. Locating contact regions symmetrically along the length of the row, and using a large number of contacts is desirable to minimize changes in gate potential caused by propagation delays along the row lines.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A focal plane array for use in an electro-optical reconnaissance system, wherein the focal plane array is configured to detect an image of a scene and to convert the image into an electronic charge representation of the image, and wherein the focal plane array is operated to compensate for a motion of objects contained in the scene, comprising:

a main format area, comprising a plurality of photosensitive cells arranged in rows and columns, wherein said rows are further arranged in a number of row segments, each row segment corresponding to a separate clocking section;

a focal plane array control unit that supplies a plurality of clocking signals to said number of row segments, each said clocking signal being applied to a respective row segment to transfer charge between rows in the respective row segment at a transfer rate determined by a frequency of the applied clocking signal wherein each said clocking signal has a predetermined synchronous timing relationship with each of the other clocking signals to prevent a mismatch in charge transfer between at least one pair of adjacent row segments having different transfer rates; and a serial register coupled to said main format area to receive the electronic charge representation from said row segments.

2. The focal plane array of claim 1, wherein said focal plane array control unit supplies the plurality of clocking signals to said main format area to perform image motion compensation, wherein said plurality of clocking signals includes a set of parallel shift clocking signals and a serial register clocking signal, and wherein said focal plane array control unit includes a master timing signal generator to generate a plurality of timing signals, and a focal plane array driver circuit to receive said plurality of timing signals from said master timing signal generator and to drive the focal plane array with said set of parallel shift clocking signals; and a camera control unit coupled to said master timing signal generator, wherein said mast timing signal generator receives data signals from said camera control unit.

3. The focal plane array of claim 2, wherein said focal plane array driver circuit comprises:

a first plurality of signal outputs corresponding to said number of row segments, wherein each of said row segments receives one of said set of parallel clocking signals; and a second plurality of signal outputs corresponding to said serial register, wherein said serial register receives a serial register clocking signal.

4. The focal plane array of claim 2, wherein the electrooptical reconnaissance system is mounted on a vehicle capable of forward motion, further comprising:

focussing means, coupled to the focal plane array, for focussing a portion of the scene onto said focal plane array, wherein said portion of the scene is defined by a field of view of said focussing means;

a signal processor coupled to the focal plane array to convert the electronic charge representation into a digital image data signal, wherein said digital image data signal is a digital representation of the image; and a plurality of sensors to provide mission parameters to said camera control unit, wherein said camera control unit processes said mission parameters and determines an image motion compensation clocking signal corresponding to said mission parameters and the motion objects contained in the scene.

5. The focal plane array of claim 4, wherein the electro-optical reconnaissance system further comprises:

a control console to receive mission programming information from an operator of said vehicle and to send said mission programming information to said camera control unit.

6. The focal plane array of claim 4, wherein the electro-optical reconnaissance system further comprises:

a memory unit, coupled to said camera control unit, to store a set of image motion rates for a particular set of mission parameters; and a programmable logic element coupled to said focal plane array driver circuit to determine an integer number of cycles for each of said set of parallel shift clocking signals performing parallel shift clocking on said row segments, wherein said set of parallel shift clocking signals corresponds to said number of row segments, and wherein said integer number of cycles corresponds to said row segment being clocked.

7. The focal plane array of claim 6, wherein said main format area further comprises:

a first row segment viewing a portion of the scene farthest from the focal plane array, wherein a parallel shift clocking signal with a fewest number of cycles clocks said first row segment; and a last row segment viewing a portion of the scene closest to the focal plane array, wherein a parallel shift clocking signal with a greatest number of cycles clocks said last row segment, said last row segment being closest to said serial register, wherein said integer number of cycles corresponds to mission parameters processed by said camera control unit, wherein said number of cycles increases corresponding to the motion of objects contained in said portion of the scene focussed on said row segment.

8. The focal plane array of claim 4, wherein said mission parameters comprise altitude, velocity, depression angle, field of view, pitch, and roll.

9. The focal plane array of claim 4, wherein the electro-optical reconnaissance system further comprises:

a shutter, coupled to said camera control unit, that opens to expose the focal plane array to the scene, and closes to allow readout of said main format area;

a camera mount housing the focal plane array; and a signal recording device, coupled to said signal processor to record said digital image data signal.

10. The focal plane array of claim 9, wherein an orientation of said camera mount is a forward oblique mode.

11. The focal plane array of claim 9, wherein said shutter has a moveable exposure slit proximate to said focal plane array.

12. The focal plane array of claim 11, wherein an orientation of said camera mount is a side oblique mode.

13. The focal plane array of claim 12, wherein a shifting of said row segments corresponds to the motion of objects imaged onto each of said row segments, wherein each of said row segments shifts at a same average rate as a projection of the objects move across said row segment.

14. The focal plane array of claim 2, wherein said predetermined number of clocking signals are received by the focal plane array on either side of the focal plane array.

15. The focal plane array of claim 1, wherein said main format area comprises a charge-coupled device (CCD) of at least 9216 columns and 9216 rows.

16. The focal plane array of claim 1, wherein said main format area is divided into an image area and a storage area, wherein said storage area stores the electronic charge representation transferred from said image area, and wherein said storage area is shielded from exposure to the scene.

17. The focal plane array of claim 16, wherein said storage area comprises a plurality of cells arranged in rows and columns, and wherein said storage area is approximately equal in size to said imaging area.

18. The focal plane array of claim 17 having a frame rate of approximately 30 images per second, wherein the electronic charge representations of said scene are shifted from said row segments of said image area to said storage area in a time of less than approximately $1/300$ second, and wherein the electronic charge representations stored in all of said rows of said storage area are read out in less than $1/30$ second.

19. The focal plane array of claim 18, wherein said image area comprises CCD array having at least 500 pixel columns and 500 pixel rows.

20. The focal plane array of claim 19, wherein the electro-optical reconnaissance system further comprises:

a camera control unit, coupled to the focal plane array, to update a set of mission control parameters;

a shutter, coupled to said camera control unit, that opens to expose the focal plane array to the scene, and closes to allow readout of said main format area;

a camera mount to house the focal plane array;

a focal plane array control unit to provide a plurality of clocking signals to said image area to perform image motion compensation;

a signal processor to process said charge representations from said storage area into an image data signal; and display means to provide a real-time display of said image data signal, wherein an orientation of said camera mount is forward oblique, and wherein said display means comprise a video monitor located in a cockpit of an aircraft.

21. The focal plane array of claim 1, wherein a first one of the plurality of clocking signals effects charge transfers between rows in an associated one of the plurality of row segments during a row-shift time interval, and wherein each said clocking signal includes an integer number of clock cycles that collectively start and end at clock cycle transitions aligned respectively with a start and an end of the row-shift time interval, to thereby prevent the mismatch in charge transfer between row segments clocked at different row transfer rates.

22. The focal plane array of claim 1, wherein each row segment includes opposing ends, each clocking signal being applied concurrently to the opposing ends of the associated row segment to thereby propagate from the opposing ends, along the row segment, and toward a center portion of the row segment.

23. The method of claim 2, wherein said at least one serial register comprises a plurality of serial registers spaced apart along an edge portion of the CCD array and coupled to said CCD main format area for reading image pixel information from the CCD array, each said serial register receiving row charges from at least one of said row segments associated with said serial register, wherein said clocking signals are applied to said row segments such that clocking signals having lowest and highest frequencies among the plurality of clocking signals are respectively applied to row segments spaced furthest from and closest to said plurality of serial registers.

24. A focal plane array for use in an electro-optical reconnaissance system, wherein the focal plane array is configured to detect an image of a scene and to convert the image into electronic charge representation of the image, and wherein the focal plane array is operated compensate for motion of objects contained in the scene, comprising:

a main format area having a plurality of photo-sensitive cells arranged in rows and columns, wherein said rows are arranged in a number of row segments, each row segment corresponding to a separate clocking section, wherein said plurality of photo-sensitive cells are further arranged into a predetermined number of column segments, wherein each of said column segments corresponds to a separate parallel clocking section and each of said column segments is electronically isolated from adjacent column segments;

a focal plane array control unit that supplies a plurality of clocking signals to said number of row segments, each said clocking signal being applied to a respective row segment to transfer charge between rows in the respective row segment at a transfer rate determined by a frequency of the applied clocking signal, wherein each said clocking signal has a predetermined synchronous timing relationship with each of the other clocking signals to prevent a mismatch in charge transfer between at least one pair of adjacent row segments having different transfer rates; and at least one serial register coupled to said main format area to receive the electronic charge representation of the image from said main format area.

25. The focal plane array of claim 24, wherein the electro-optical reconnaissance system further comprises:

a focal plane array control unit to provide a plurality of clocking signals to said main format area to perform image motion compensation, wherein said focal plane array control unit includes
a master timing signal generator to generate a plurality of timing signals, and
a focal plane array driver circuit to receive said plurality of timing signals from said master timing signal generator and to drive the focal plane array with a set of parallel clocking signals;

focussing means, coupled to the focal plane array, for focussing a portion of the scene onto said focal plane array, wherein said portion of the scene is defined by a field of view of said focussing means;

a signal processor coupled to the focal plane array to convert the electronic charge representation into a digital image data signal, wherein said digital image data signal is a digital representation of the image;

a camera control unit coupled to said focal plane array control unit;

a plurality of sensors to provide mission parameters to said camera control unit, wherein said camera control unit processes said mission parameters and calculates said image motion compensation clocking signals corresponding to said processed mission parameters; and a camera mount housing the focal plane array, wherein a preferred orientation of the electro-optical reconnaissance system is a side oblique mode.

26. The focal plane array of claim 24, wherein a first one of the plurality of clocking signals effects charge transfers between rows in an associated one of the plurality of row segments during a row-shift time interval, and wherein each said clocking signal includes an integer number of clock cycles that collectively start and end at clock cycle transitions aligned respectively with a start and an end of the row-shift time interval, to thereby prevent the mismatch in charge transfer between row segments clocked at different row transfer rates.

27. A method of image motion compensation for an aerial electro-optical reconnaissance system, comprising the steps of:

(1) imaging a scene onto a focal plane array, wherein the scene contains a plurality of objects, and wherein the focal plane array includes a main format area comprising a plurality of photo-sensitive cells arranged in rows and columns and at least one serial register, wherein the rows are arranged into a number of row segments, each row segment corresponding to a separate clocking section;

(2) generating a predetermined number of synchronous, separate clocking signals to perform parallel shift clocking of the row segments; and (3) transferring charges representing a portion of the scene stored in each row of a particular row segment at a charge transfer rate corresponding to a motion rate that the object from the portion of the scene appear to move across that particular row segment, wherein said transferring step includes the steps of:
transferring charges between rows in each row segment at a charge transfer rate determined by a frequency of one of said separate clocking signals respectively associated with said row segment, and
synchronizing a timing relationship between said clocking signals to prevent a mismatch in charge transfer between at least one pair of adjacent row segments having different charge transfer rates.

28. The method of claim 27, wherein step (2) comprises the steps of:

(a) measuring a set of mission parameters corresponding to the scene being imaged by the reconnaissance system;

(b) processing the mission parameter information, wherein said processed mission parameter information corresponds to a rate of motion of the objects contained in the scene;

(c) generating a number of parallel shift clocking signals corresponding to the processed mission parameter information and to the number of row segments, wherein each of the parallel shift clocking signals includes an integer number of cycles; and (d) increasing the number of cycles comprising the parallel shift clocking signal corresponding to the row segment being clocked, wherein a clocking signal with a fewest number of cycles clocks a first row segment and a clocking signal with a greatest number of cycles clocks a last row segment, wherein the first row segment corresponds to the portion of the scene farthest from the focal plane array, and wherein the last row segment corresponds to the portion of the scene closest to the focal plane array.

29. The method of claim 27, further comprising the step of:

recording a digital version of the electronic charge representation of the scene.

30. The method of claim 27, further comprising the steps of transferring charge between rows in a first one of said row segments during a row-shift time interval using an associated one of said clocking signals;

generating an integer number of clock cycles representing each of said clocking signals; and aligning a start and an end of the integer number of clock cycles with a start and an end of said row-shift time interval, to thereby prevent the mismatch in charge transfer between row segments clocked at different row transfer rates.

31. A method of image motion compensation for an aerial electro-optical reconnaissance system, comprising the steps of:

(1) imaging a scene onto a focal plane array, wherein the scene contains a plurality of objects, and wherein the focal plane array includes a main format area comprising a plurality of photo-sensitive cells arranged in rows and columns, wherein the rows are arranged into a number of row segments and the columns are arranged into a number of column segments, wherein a region comprising at least one row segment and at least one column segment is called a mosaic region, each mosaic region corresponding to a separate clocking section;

(2) generating a predetermined number of synchronous separate clocking signals to perform parallel shift clocking of the mosaic regions; and (3) transferring charges representing a portion of the scene stored in a particular mosaic region at a same rate as an object from the scene appears to move across the mosaic region, wherein the charges are read out by a serial register and wherein said transferring step includes the steps of:

transferring charges between rows in each row segment at a charge transfer rate determined by a frequency of one of said separate clocking signals respectively associated with said row segment, and synchronizing a timing relationship between said clocking signals to prevent a mismatch in charge transfer between at least one pair of adjacent row segments having different charge transfer rates.

32. The method of claim 31, further comprising the steps of transferring charge between rows in a first one of said row segments during a row-shift time interval using an associated one of said clocking signals;

generating an integer number of clock cycles representing each of said clocking signals; and aligning a start and an end of the integer number of clock cycles with a start and an end of said row-shift time interval, to thereby prevent the mismatch in charge transfer between row segments clocked at different row transfer rates.

33. A method of transferring charges stored in a charge coupled device (CCD) mounted in a moving vehicle to perform image motion compensation, comprising the steps of:

(1) imaging a moving scene onto the CCD, wherein the CCD includes a main format area comprising a plurality of photo-sensitive cells arranged in rows and columns and at least one serial register;

(2) arranging the rows into a predetermined number of row segments; and (3) clocking each row segment with a parallel shift clocking signal such that the rows of a particular row segment shift at a substantially similar rate as objects contained in the moving scene appear to move across a mid point row of the particular row segment, wherein said clocking step includes the steps of:

transferring charges between rows in each row segment at a charge transfer rate determined by a frequency of one of said separate clocking signals respectively associated with said row segment, and synchronizing a timing relationship between said clocking signals to prevent a mismatch in charge transfer between at least one pair of adjacent row segments having different charge transfer rates.

34. The method of claim 33, wherein step (3) comprises the step of:

clocking all row segments in synchronism with the image motion.

35. The method of claim 34, wherein step (3) further comprises the step of:

clocking each row segment at a constant rate corresponding to an average value of the image motion across each row of that row segment.

36. The method of claim 33, further comprising the steps of:

transferring charge between rows in a first one of said row segments during a row-shift time interval using an associated one of said clocking signals;

generating an integer number of clock cycles representing each of said clocking signals; and aligning a start and an end of the integer number of clock cycles with a start and an end of said row-shift time interval, to thereby prevent the mismatch in charge transfer between row segments clocked at different row transfer rates.

* * * * *